L. A. HAINES.
GAS TURBINE.
APPLICATION FILED APR. 3, 1914.

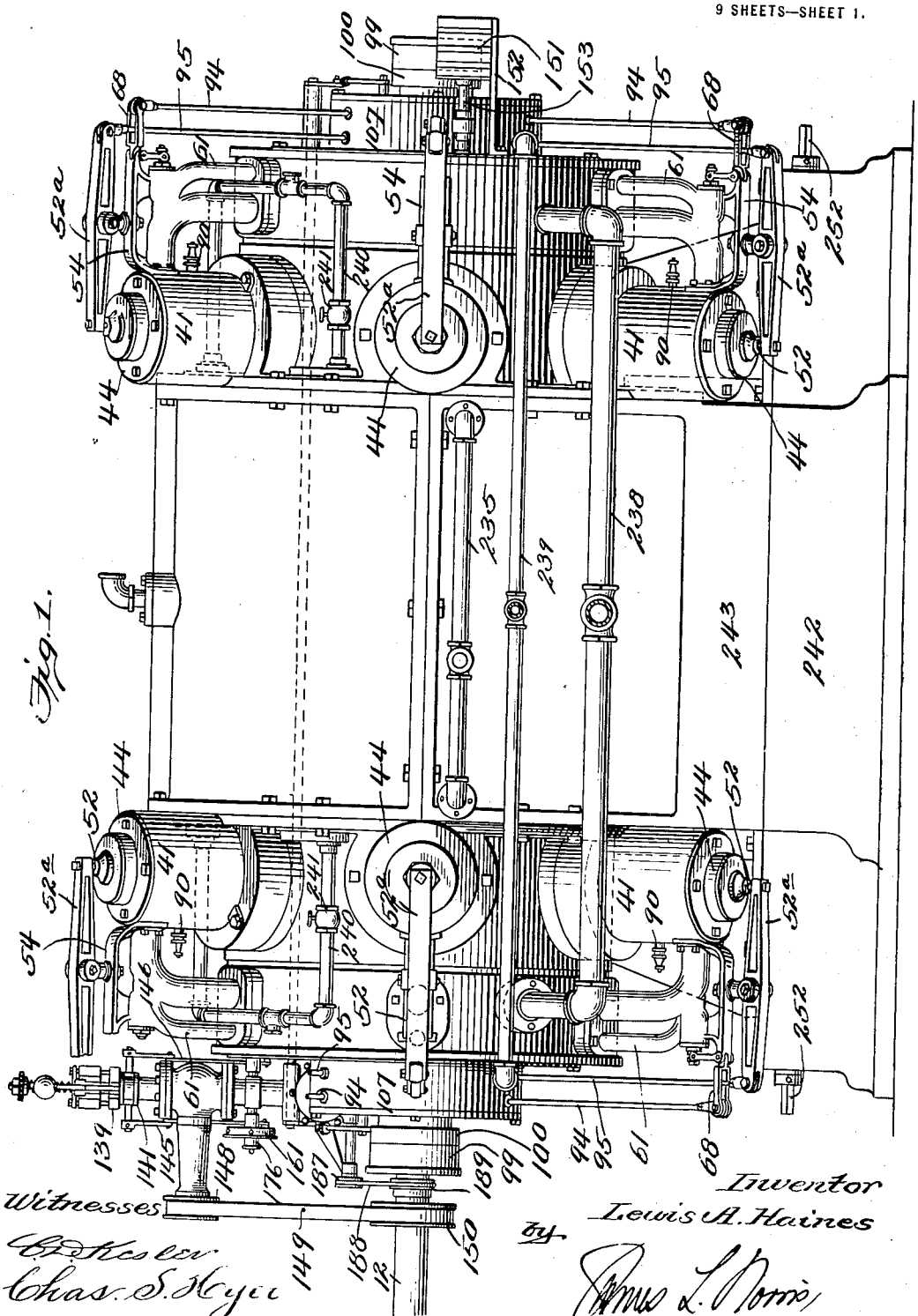

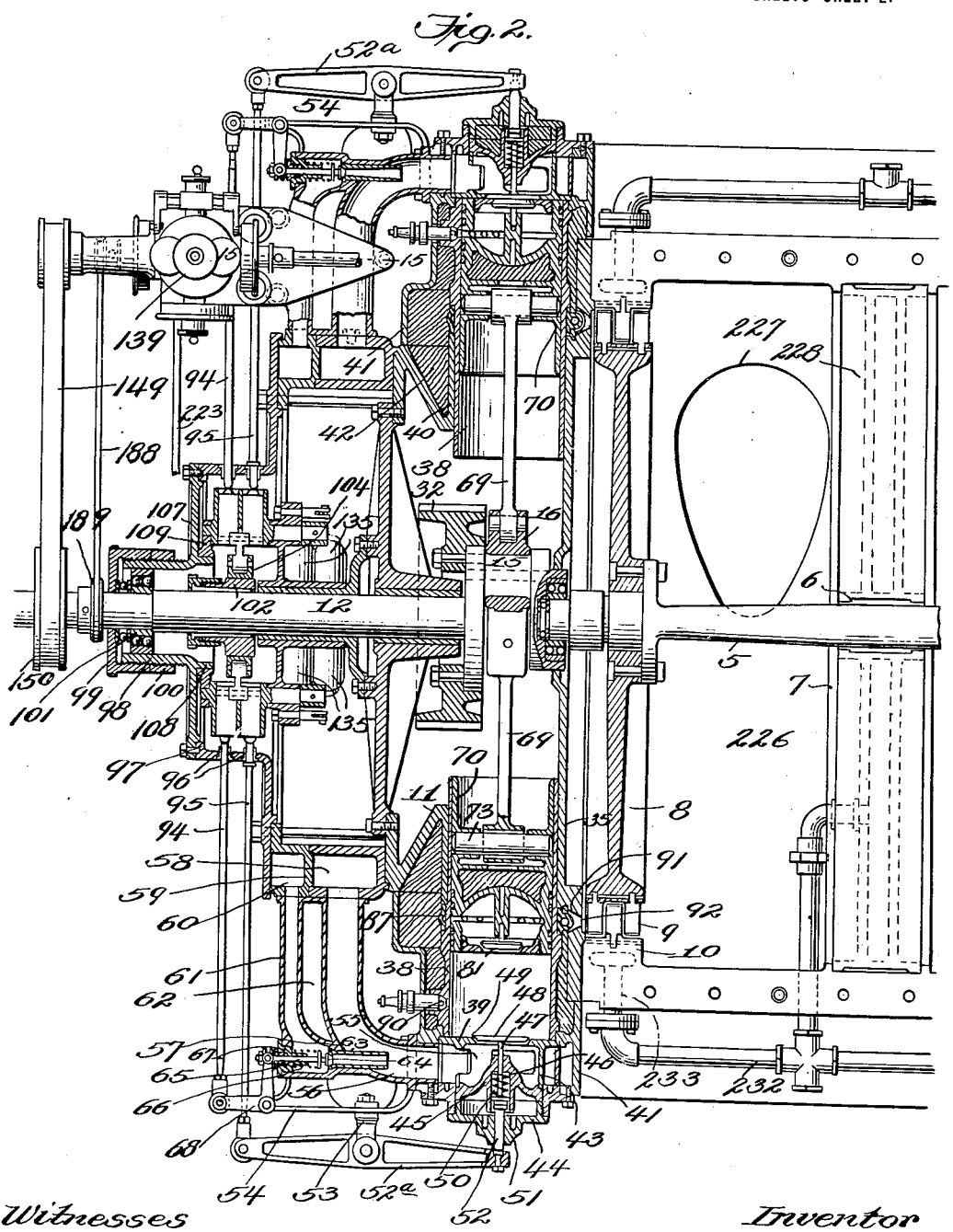

1,219,297.

Patented Mar. 13, 1917.

Witnesses:
G. Kesler
Chas. S. Hoyer

Inventor
Lewis A. Haines
by James L. Norris,
Attorney

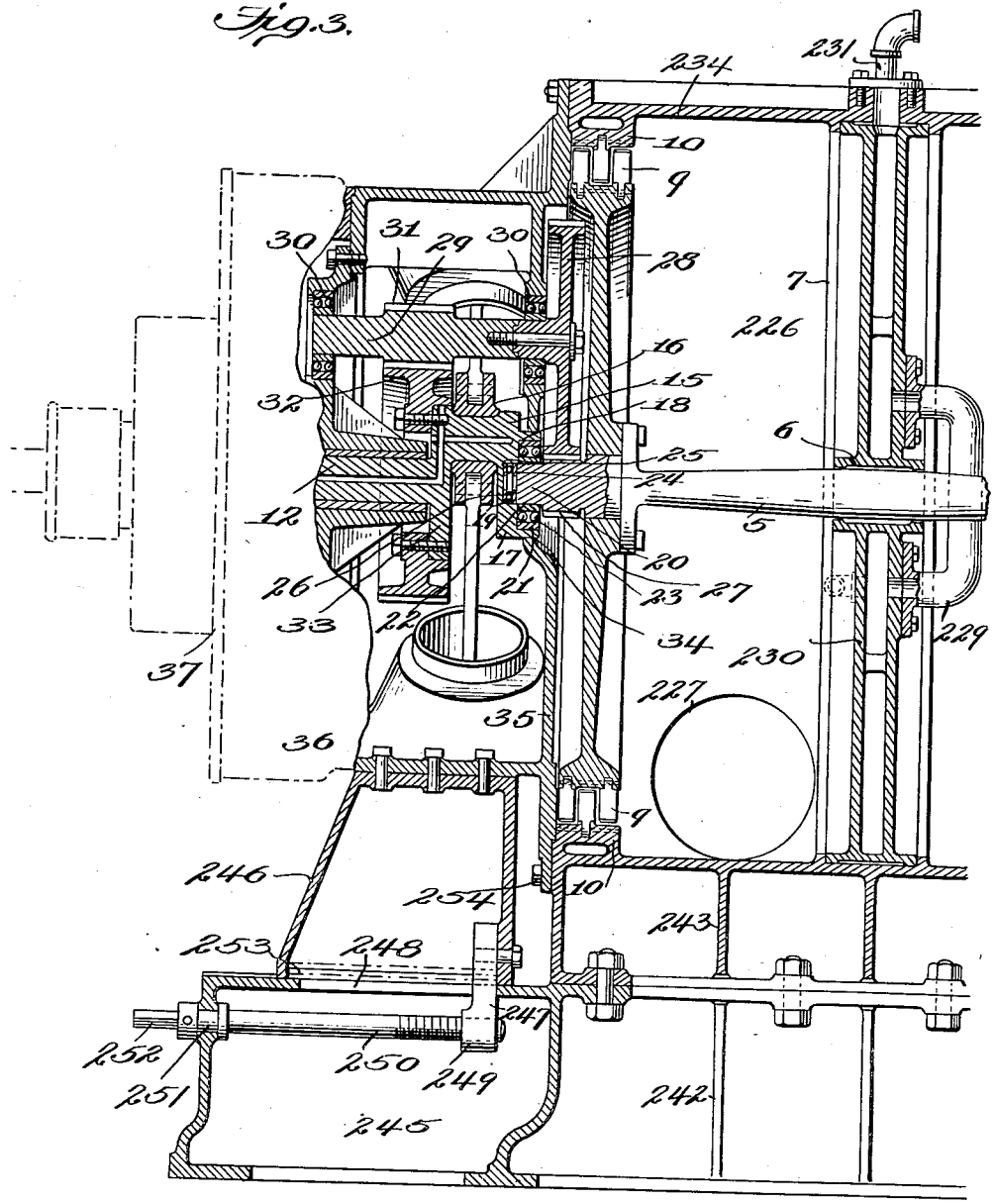

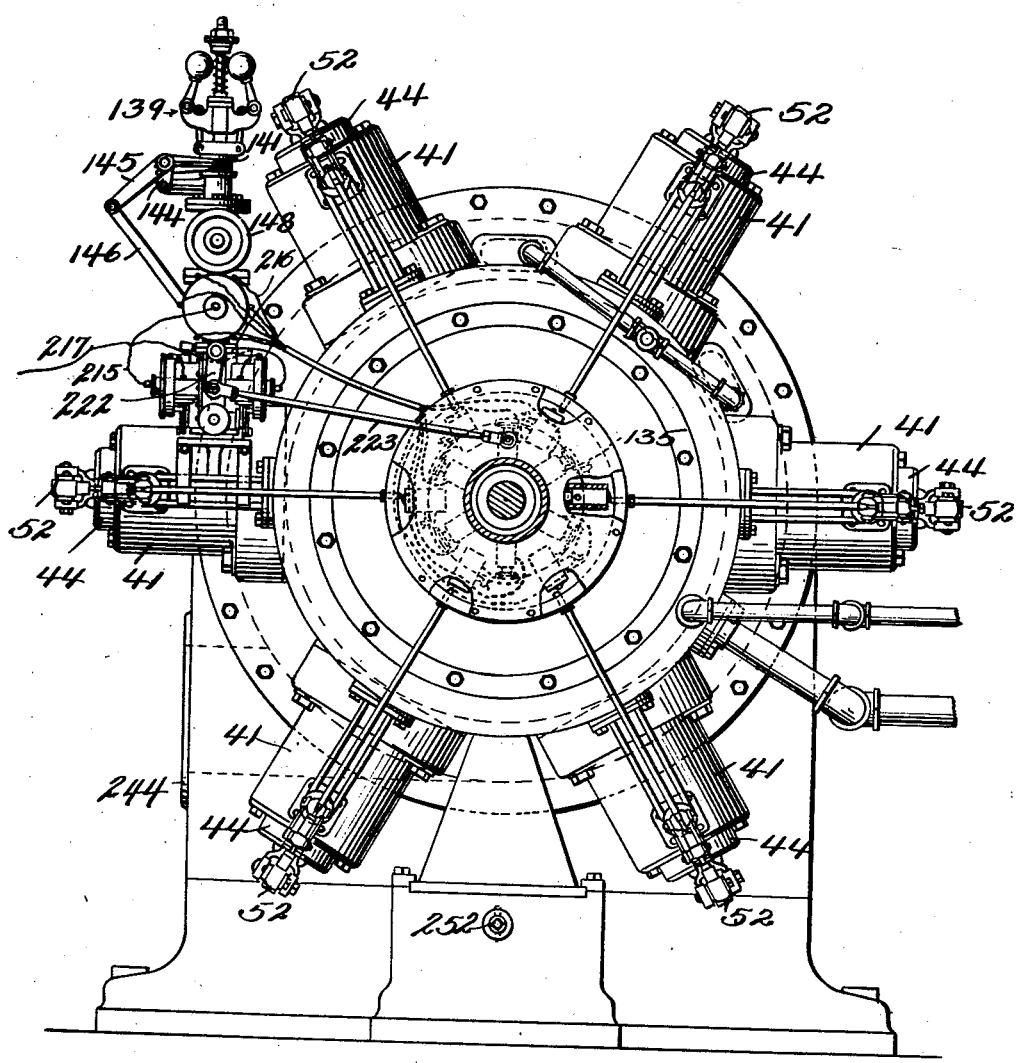

L. A. HAINES.
GAS TURBINE.
APPLICATION FILED APR. 3, 1914.
1,219,297.
Patented Mar. 13, 1917.
9 SHEETS—SHEET 6.
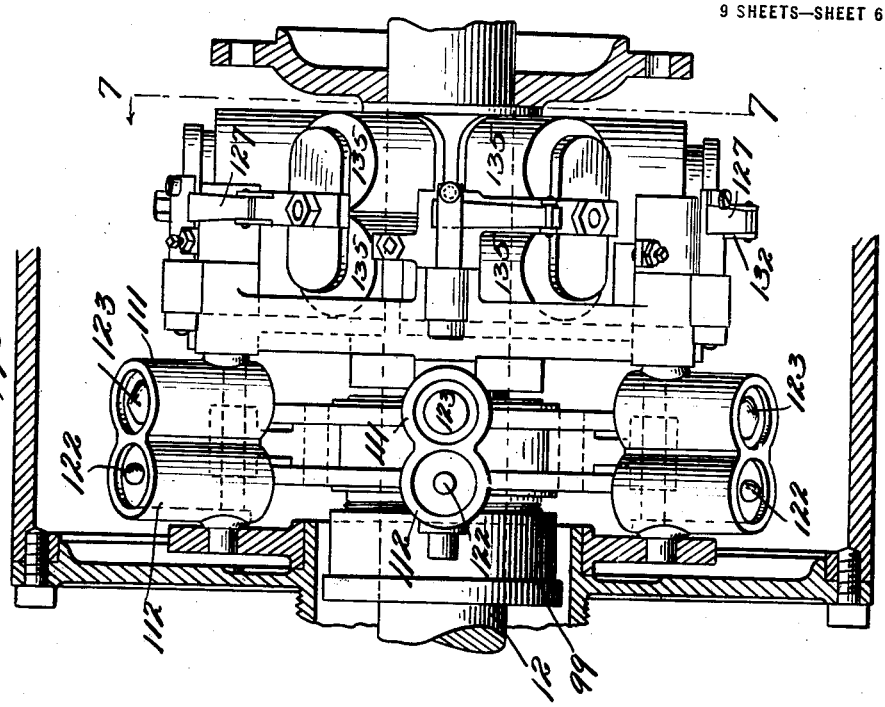
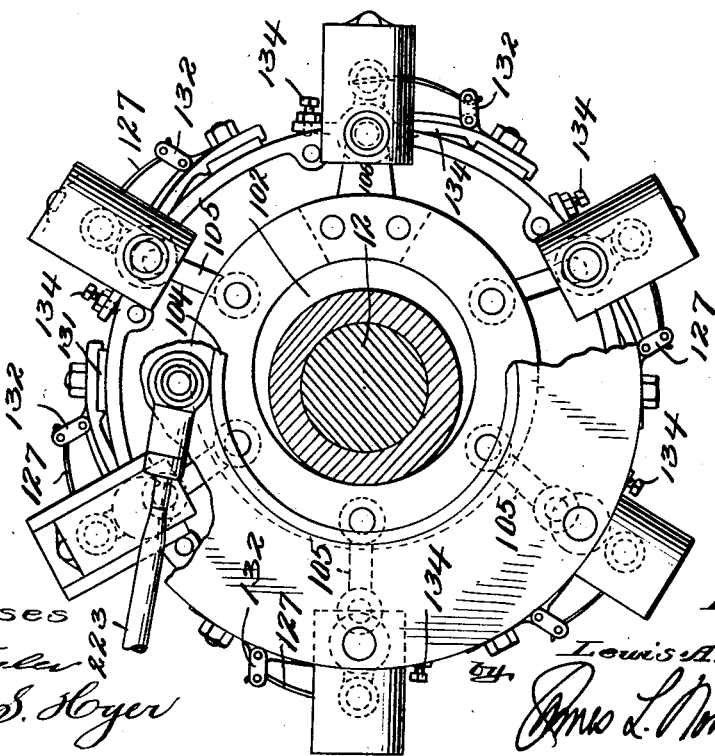
Witnesses
Inventor
Lewis A. Haines
Attorney

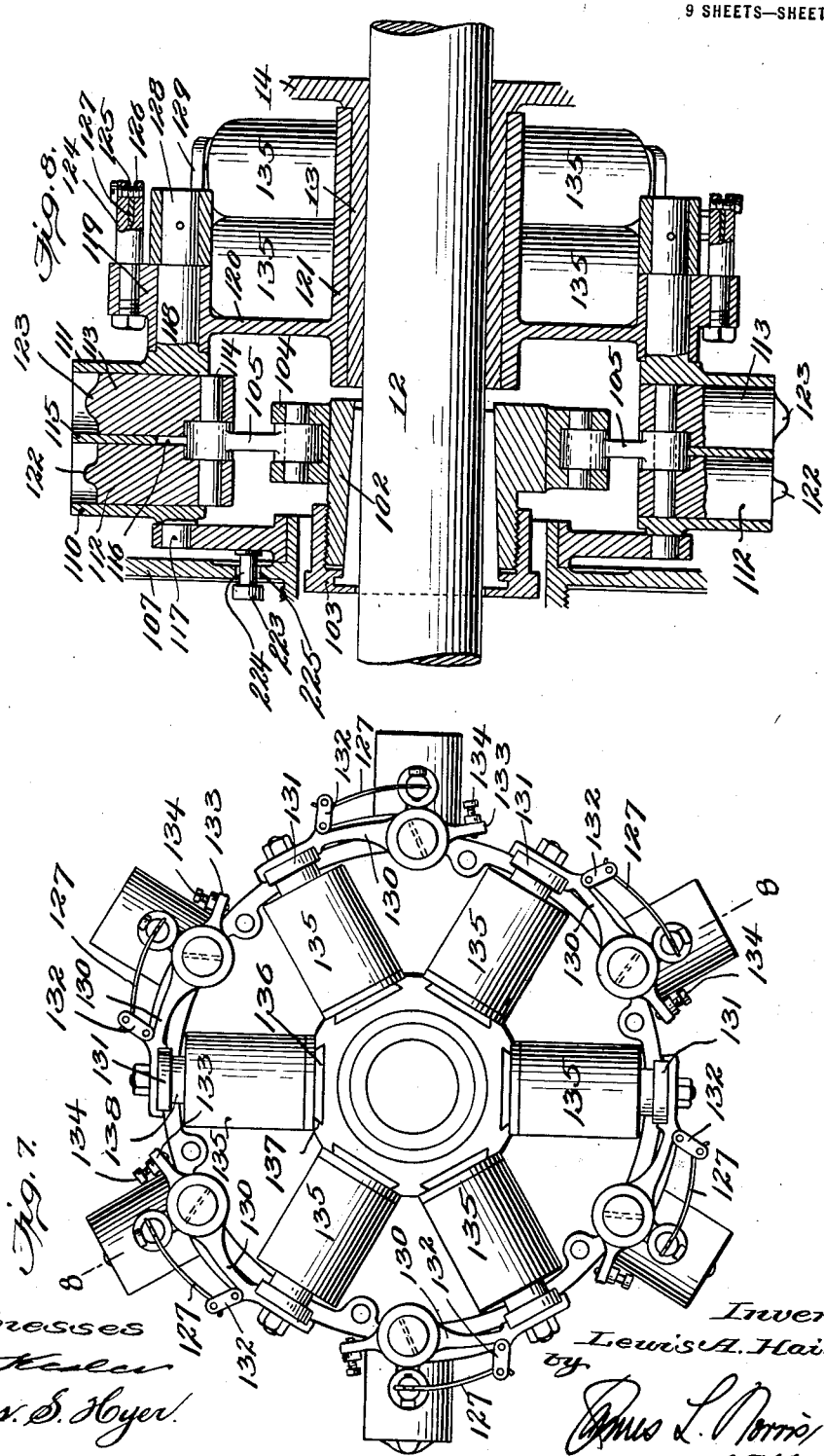

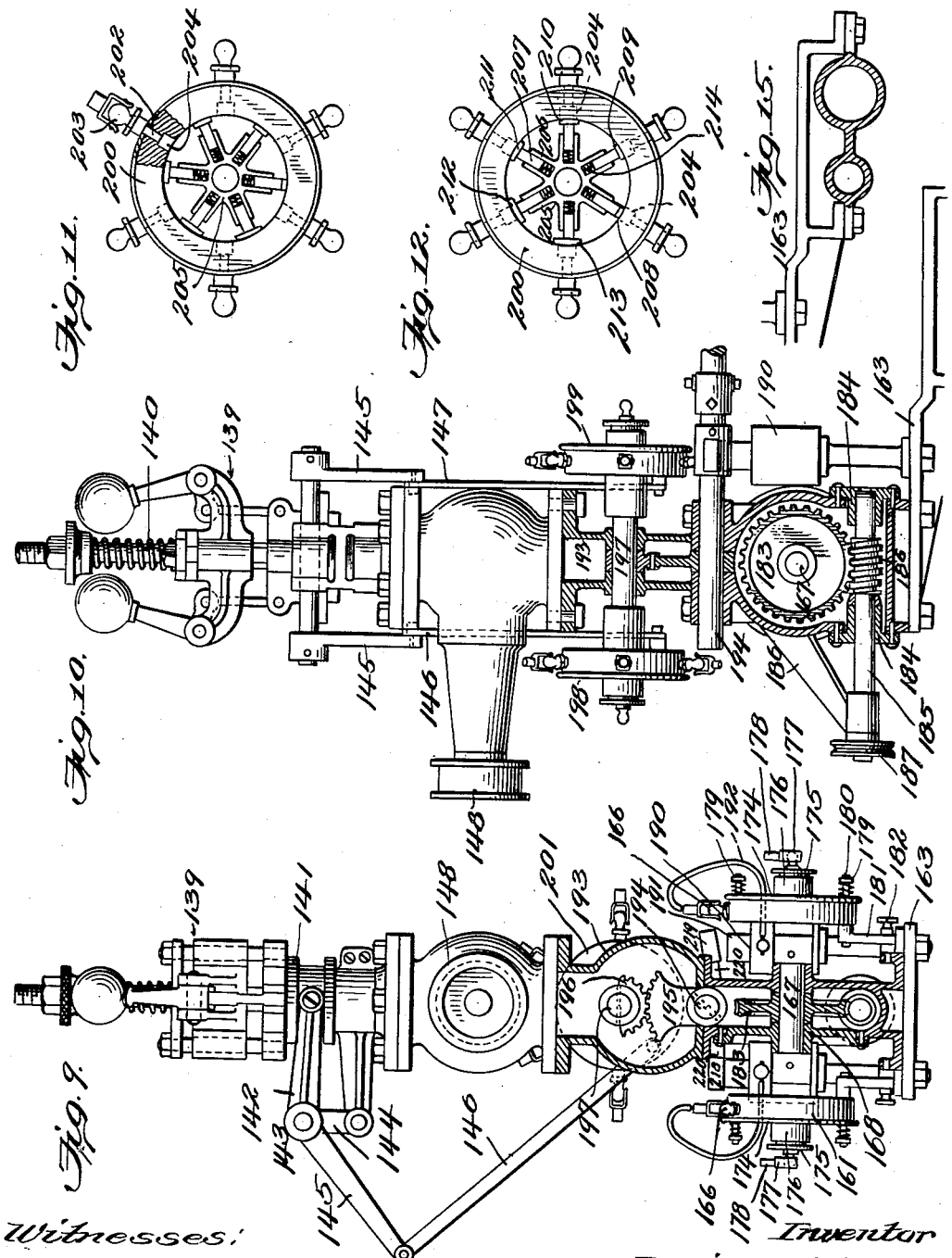

L. A. HAINES.
GAS TURBINE.
APPLICATION FILED APR. 3, 1914.
1,219,297.
Patented Mar. 13, 1917.
9 SHEETS—SHEET 9.
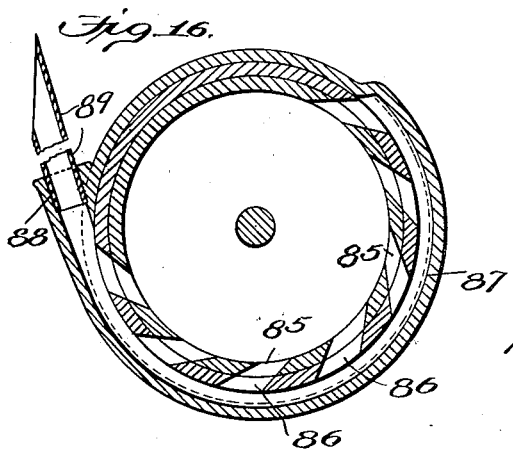
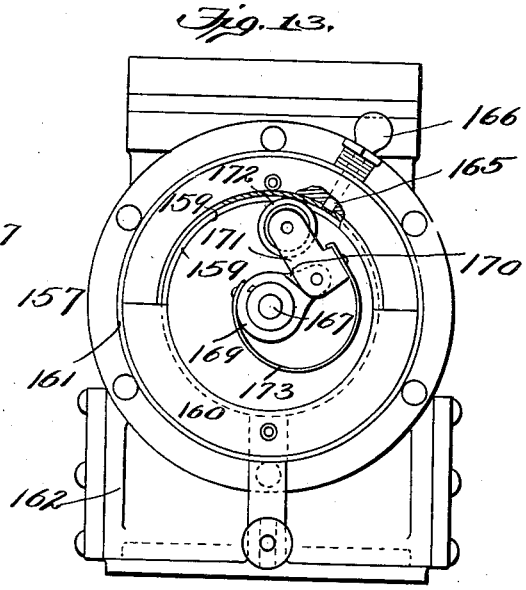
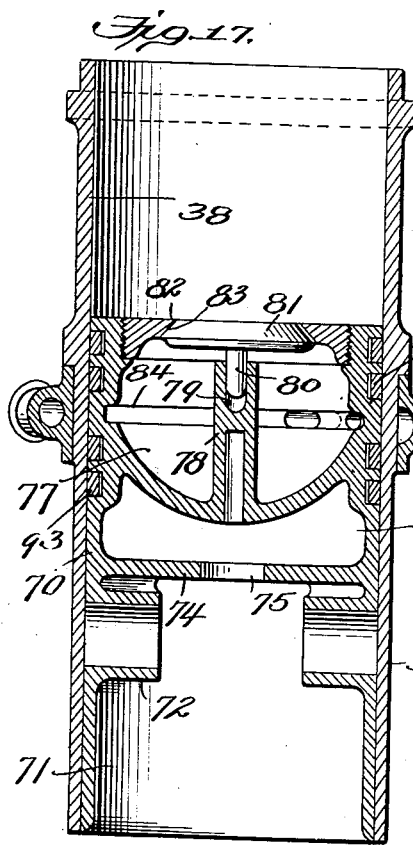
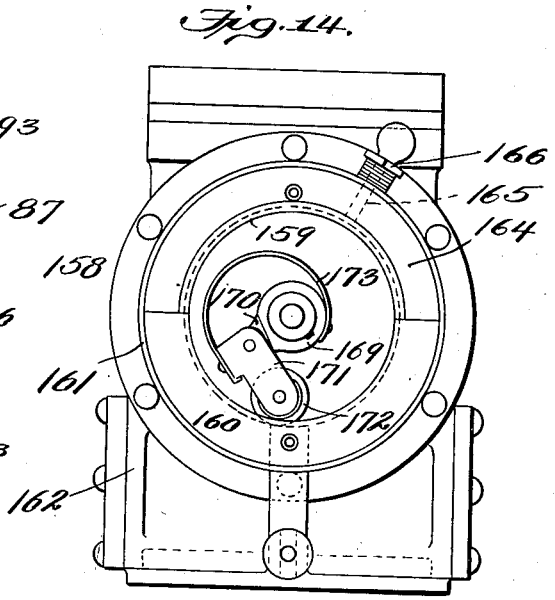
Witnesses:
Inventor
Lewis A. Haines,
by James L. Norris,
Attorney.

UNITED STATES PATENT OFFICE.

LEWIS A. HAINES, OF COLUMBUS, OHIO.

GAS-TURBINE.

1,219,297. Specification of Letters Patent. Patented Mar. 13, 1917.

Application filed April 3, 1914. Serial No. 829,283.

*To all whom it may concern:*

Be it known that I, LEWIS A. HAINES, a citizen of the United States, residing at Columbus, in the county of Franklin and State of Ohio, have invented new and useful Improvements in Gas-Turbines, of which the following is a specification.

This invention relates to gas turbines of the internal combustion type of that class wherein a part of the working organization is permitted to cool down and remain propulsively inactive while the remaining part of the organization is receiving the explosive medium and effectively driving a turbine on a shaft geared up or operatively connected to both parts of the working organization. In gas engines of the turbine class using an explosive motive agent a highly heated condition of the driving elements ensues and it is essential that the temperature of said elements be automatically controlled to reduce as much as possible the structural deterioration of the driving means with which the highly heated explosive motive agent comes in contact. A gas turbine of this type to be commercially effective must be reliably automatic in its operation, both as to the alternating driving activity of the opposing parts of the turbine and also as to the supply, compression and combustion of the explosive medium and the delivery of the latter to the turbine elements. It is also necessary in turbines of this class to control and regulate the combustion or explosion of a motive agent in one or more combustion chambers in proportion to the load on the motor and to have the chambers so arranged that the motive agent will be supplied with a cycling movement and also to provide means for instantly throwing a part of the chambers and the feeding means therefor out of and into commission as the load may require and also to effect a translation of the number of working chambers from one part of the working organization to the other without the least variation and in proportion to the load on the motor. Moreover, it is required for practical purposes that the speed of rotation of the shafts controlling the operation of the compressing and combustion chambers and the pistons in the latter be determined to avoid a maximum that would be too great for effective actuation of the chambers and their pistons and the motive agent feeding means, yet at the same time generate a power sufficient for operating heavy machinery without fluctuation or with the same degree of constancy as is possible with a steam motor or engine.

In the present construction of gas turbine the combustion chambers are located or structurally embodied within the pistons, and after the explosion is effected the charge in the combustion chamber of each piston is completely burned before liberation ensues relatively to the adjacent turbine and at the time that the combustion of the charge takes place in each piston a new charge of the motive or explosive medium is drawn into each cylinder to quicken the supply of the motive medium and also to materially cool the piston. The turbines in the present structure are located within a central inclosure and are fixed to a common shaft provided with rotating bearings revolving in the same direction as the turbine shaft and of an antifrictional type which materially eliminates friction and reduces wear on the extremities of the turbine shaft and also renders the said shaft sensitive as a motion transmitting means through the medium of suitably timed gears relatively to the power shafts associated with and controlling the operation of the working parts which control and regulate the feed compression, explosion and combustion of the motive agent. In the present instance also a governor mechanism is embodied and has a group of organizations associated therewith whereby the alternation of the working groups of cylinders and pistons may be regularly effected from the power shafts and whereby the controller for the feed of the explosive medium and air may be actuated when variation in the load requires. These groups of organizations in association with the governor mechanism include electrically connected timers of particular construction to render them active in accordance with a certain number of revolutions made by the power shafts, and the governor mechanism also coöperates with a regulator system embodying two regulating organizations which are also operatively connected to the controllers and particularly affect the activity of the cylinders and pistons and the feed of the motive agent in proportion to the load on the motor with certainty and accuracy. The improved gas turbine also embodies other features of construction and novel mechanisms all conjointly operating to render the entire organization effective in its desired actuation and which will be more fully hereinafter described in preferred form.

In the drawings:

Figure 1 is a side elevation, broken away in part, of a gas turbine embodying the features of the invention.

Fig. 2 is a horizontal section of one-half of the improved gas turbine.

Fig. 2ª is a horizontal section of the remaining half of the improved gas turbine.

Fig. 3 is a longitudinal vertical section of a portion of one end of the improved gas turbine.

Fig. 4 is an end elevation of the improved gas turbine looking toward the extremity at which the governor is located and shown partially broken away and in section.

Fig. 5 is an enlarged elevation, partially broken away, of the controller disposed about the outer extremity of each power shaft, parts of the controller being partially broken away.

Fig. 6 is a longitudinal section through one end of the turbine particularly showing the parts of the controller and means for supporting the same, the controller organization being illustrated in side elevation.

Fig. 7 is a transverse vertical section on the line 7—7, Fig. 6.

Fig. 8 is a transverse vertical section on the line 8—8, Fig. 7.

Fig. 9 is a detail view of the governor in side elevation, timer mechanism, and regulator mechanism associated with the governor and illustrated in partial transverse section and elevation.

Fig. 10 is a detail view of the mechanism shown by Fig. 9 in planes at right angles to the latter with corresponding changes in the sectional illustration of the timing mechanism and regulator.

Fig. 11 is a detail elevation, partially broken away, showing one of the timers and illustrating the shiftable contact shoes out of alinement with relation to the contacts.

Fig. 12 is a detail elevation of one of the timers showing the shiftable contact shoes in engagement with the contacts.

Fig. 13 is an elevation of one of the elements of the regulator showing a part thereof removed and other parts in section, this member of the regulator being shown in active condition.

Fig. 14 is a detail elevation of the remaining member of the regulator having a part thereof removed and showing it in inactive condition.

Fig. 15 is a horizontal section taken in the plane of the line 15—15, Fig. 2, and particularly showing a supporting bracket and the webbed construction and connection of the gas and air feeding pipes for each cylinder.

Fig. 16 is a horizontal section through one of the cylinders and pistons particularly illustrating the angular or tangential disposition of the registering outlets with respect to a discharge channel.

Fig. 17 is a transverse vertical section through one of the cylinders and pistons and discharge channel, the piston rod being omitted.

The numeral 5 designates a turbine or main driving shaft extending through and freely running in an opening 6 at the center of a partition 7, said turbine or main driving shaft having turbines 8 secured on opposite extremities thereof and provided with any approved type of turbine blades 9 adapted for the purpose and freely rotating within annular water jacket extensions 10. Each turbine 8 is arranged in the present instance for conjoint operation with means for supplying the prepared or heated motive agent thereto or with individual organizations comprising a plurality of cylinders and pistons and a power shaft together with motive agent supply devices and controlling timing and regulating mechanisms, the individual organizations being in the present instance respectively indicated by the reference characters A and B, as clearly indicated by Figs. 2 and 2ª. A detail description of the organization indicated as a whole by the reference character A will suffice for that indicated by the reference character B, as both organizations are of duplicate construction in every particular, and each comprises a suitable open framework 11 of such general contour and structural inter-relation as to provide a positive and reliable support and means of attachment for the several instrumentalities which will be presently explained. This framework 11 will be constructed as light as possible but of a strong and durable nature to resist breakage by ordinary weight stress and vibration that may be imparted thereto from the working parts. The organizations A and B each includes a power shaft 12 mounted to rotate in an elongated bearing sleeve 13 having an inner securing flange or member 14 attached to the frame, each shaft 12 having a crank 15 on the inner end thereof loosely engaged by a crank box or disk 16, the inner crank member 17 being cored out or recessed as at 18 and 19 to provide a rotating bearing for the adjacent reduced end 20 of the turbine or main driving shaft 5, said rotating bearing comprising a hard metal ring 21 snugly fitted against the wall of the recess 18, and a companion ring 22 of smaller diameter secured on the reduced end 20 of the turbine or main driving shaft with balls 23 interposed between the two rings. The said rotating bearing also includes an end or thrust bearing comprising disks 24 and 25 which are set in the recess 19 of the crank member 17 and spaced for the reception of antifrictional balls 26 therebetween. These rotating bearings materially add to the effective operation of the turbine or main driving shaft 5 by taking off the wear and end thrust from the opposite ends of the said shaft 5 as well as in the reduction of friction to a minimum. Each end of the turbine or main driving shaft 5 is also formed or provided with a pinion 27 held in continual mesh with a gear 28 fast on a counter-shaft 29 mounted in antifrictional bearings 30 in parts of the frame, said counter-shaft having a pinion 31 held in mesh with a gear 32 secured to the inner member 33 of the crank 15, as clearly shown by Fig. 3, and through the medium of this gearing the power shaft 15 is properly timed in its operation or rotation relatively to the turbine or main driving shaft 5. The dimensions of the several pinions and gears interposed between the turbine or main driving shaft and each power shaft may be modified or regulated at will in accordance with the required speed of the power shafts, and it will be seen that the interposition of the gears between the ends of the turbine or main driving shaft and the cranks 15 of the power shafts results in a direct and positive operation of the power shafts within a minimized space and without liability of fluctuation of said shafts. It will also be understood that the rotating bearings for the ends of the turbine or main driving shaft in the crank members 17 saves considerably in the structural elements for mounting the turbine shaft and the components of these bearings will be of hard metal so as to resist wear and maintain the said turbine or main driving shaft and the turbines 8 in true running position. The crank member 17 of each power shaft 12 is in effect a part of the shaft 12 and is in direct alinement with the power shaft proper, said member being mounted in a suitable opening 34 formed in an inner closure or housing plate 35 which is preferably integral with a surrounding shell 36 having an outer suitably formed cap plate or closure 37. The construction of the plate 35, shell 36 and cap plate 37, however, is incidental and these parts may be varied at will and suitably secured to the various members or elements of the frame 11 so as to solidify the supporting means for the operating parts of each organization A and B and give stability to the turbine generally. The object of the separate power shaft organization is to permit the turbine or main driving shaft 5 to run freely at a predetermined high rate of speed and the shafts 12 at a correspondingly low rate of speed so as to effect a regular and practical operation of the dual mechanisms for controlling the feed, compression, explosion and combustion of the motive agent and insure constancy in the accumulation and delivery of the prepared or heated motive agent to the turbines 8, the gearing interposed between the opposite extremities of the turbine or main driving shaft and the power shafts serving as a compensating means which will produce a ratio of speed relatively to the power shafts 12 as may be desired or found necessary in operating certain mechanisms with which the improved gas turbine may be used.

Radially arranged around each power shaft 12 is a plurality of cylinders or shells which in the present instance are shown as six in number and are indicated by the reference character 38 and are clearly shown by Figs. 2 and 2ª. Each cylinder or shell 38 is fully open at its inner end and has an outer closing head 39, the several cylinders being mounted in inclosing casings 40 formed as a part of the frame and provided with compartments as at 41 in which suitable packing material 42 is introduced to reduce the heat radiation and likewise to prevent the several cylinders from becoming heated to any material extent by adjacent parts of the turbine and thus facilitate cooling the several cylinders at intervals in a manner which will be more fully hereinafter explained. Each cylinder head 39 is hollow and formed with a double wall, as at 43, and between the same and the adjacent part of the casing 41 which is extended outwardly beyond each cylinder a suitable packing is introduced. Each cylinder head 39 also has an outer valve cap or member 44 secured thereto and likewise formed hollow to receive a suitable packing. The valve cap 44 is constructed with a central support 45 formed with a chamber 46 arranged in radial relation to the outer end of the cylinder or in longitudinal alinement with the center of the cylinder, and mounted in the said support is a loose valve stem 47 having a valve 48 at its inner end which coöperates with a valve seat 49 in the inner wall of the head 39, the valve stem 47 being engaged by a spring 50 which tends to automatically close the valve. In the outer portion of the support 45 and also loosely engaging a center bearing 51 in the outer end of the cap 44 is a push-pin 52 which is loose and has free movement relatively to the outer end of the valve stem 47, the push-pin 52 being normally projected outwardly from the center bearing 51 for engagement by the inner end of a rocking lever 52ª intermediately fulcrumed as at 53 on an adjacent part of the shell 36 through the medium of a supporting bracket 54, as clearly shown by Fig. 1. The valve 47 constitutes an inlet valve with relation to the cylinder 38 and regulates the admission of the successive charges of the motive agent to the outer end of the said cylinder. Arranged adjacent to each cylinder 38 and its hollow head 39 is an air and gas supply means, the hollow head 39 serving as and constituting a receiving chamber 55 with the outer portion of which an inlet pipe 56 has communication and for a portion of its length being a conduit for conveying a mixture of air and gas to the receiving chamber 55. The inlet pipe 56 continues outwardly a short distance from the head 39 and is formed with an elbow 57, and from the said elbow is extended inwardly in a radial direction and opens into an annular air chamber 58 which may have air at atmospheric or greater pressure supplied thereto. Adjacent to the air chamber and divided from the latter by a partition 59 is an annular gas chamber 60 having a pipe or conduit 61 communicating therewith and extending outwardly and then inwardly toward the elbow 57, the air feeding and gas feeding pipes being of integral structure and connected by a web 62. The formation of these two pipes as a unit is materially advantageous in mounting the same in connection with the chambers 58 and 60 and the head 39, and by such structural provision considerable time and labor will be saved in associating the several parts of the turbine organization by reason of the fact that the necessity of coupling up separate pipes and adjusting and truing the same will be avoided. The outer end of the gas pipe or conduit 61 of this unitary pipe structure is formed with a nozzle 63 which is projected through the elbow 57 some distance inwardly into the inlet pipe 56 and constitutes an injector for delivering the gas to the air that passes into the pipe 56 and mixes with the air so that a chamber 55 is successively charged with the proper proportion of gas and air to effect the best results from a standpoint of explosion and combustion to produce the motive agent in the best form for driving the turbines. The quantity of gas passing into the nozzle or injector 63 and from the latter into the inlet pipe 56 is regulated by a valve 64 secured to a stem 65 mounted in suitable supports and engaged by a spring 66 which tends to normally close the valve. The stem 65 of the valve 64 projects exteriorly through a stuffing box or gland 67 and is operatively engaged by one arm of a bell-crank lever 68 fulcrumed on the outer end of the supporting bracket 54, the said valve stem being moved longitudinally to open the valve 64 against the resistance of the spring 66 which always tends to close the valve against its seat in the outer end of the nozzle or injector 63. Each of the six cylinders in each organization A and B is equipped with a head 39, cap 44, inlet pipe 56 continuing into an air feeding pipe, a gas feeding pipe 61 preferably integrally formed with the air feeding pipe as explained, a nozzle or injector 63 provided with a valve 64 and exteriorly projecting spring-actuated stem 65, a bell-crank lever 68, and a rocking lever 52 coöperating with a push-pin mounted in the cap 44 and operative through the rocking lever against the resistance of a spring 50 to open the valve 48 for the admission of successive charges into each cylinder. The rocking levers 52 and the bell-crank lever 68 are regularly operated by means which will be hereinafter explained to open the valves 48 and 64 at timed intervals and in accordance with the load on the turbine or motor as a whole so that the charges of the motive agent may be successively admitted to the cylinders 38 at a proper degree of richness to produce the best results. The crank box or disk 16 engaging the crank 15 is eccentric with relation to said crank, and thereto piston rods 69 corresponding in number to the cylinders 38 are movably attached, the said piston rods projecting radially into the inner open ends of the cylinders 38 and movably connected to the inner extremities of pistons 70. As disclosed in my prior Patent No. 1,025,869, one of the piston rods of each group has its inner extremity fixed to the disk 16 and the outer extremity movably attached to its piston similarly to the remaining piston rods, and by fixing the inner extremity of one piston rod the disk is maintained in proper position against wabbling or irregular movement and a positive operation of the disk relatively to the crank is insured. It will therefore be understood that the one piston rod which is fixed at its inner end to the disk 16 acts as a holding leg for the said disk, but in the performance of this function this piston rod will not be in the least restricted in its reciprocating and oscillating movements. The construction of the cylinders 38 and pistons 70 is clearly shown on an enlarged scale by Fig. 17 and the inner extremity of each piston is formed as a hollow chamber 71 with inwardly projecting trunnion bearings 72 for the trunnions 73 of each piston rod 69. Adjacent to the trunnion bearings 72 is a cross-partition 74 having a central opening 76 to receive a suitable packing to prevent radiation of the heat to adjacent parts of the piston and cylinder and in advance of the packing chamber 76 the piston is formed with a combustion chamber 77 in which is a central support or socket member 78 having a socket 79 in its outer end to receive the stem 80 of a loosely mounted valve 81 coöperating with a seat 82 around a valve opening 83 which is adapted to set up communication between the combustion chamber 77 in the piston and the cylinder 38. The valve seat 82 is shown as a separate member removably mounted in the outer end of the piston and made of a harder metal than the remaining portion of the piston so as to resist wear by the action of the valve 81 in relation thereto. The wall of the combustion chamber 77 is formed with an inner channel 84 from which a plurality of openings or ports 85 extends outwardly at an angle or tangentially with relation to the piston wall and adapted to coincide with a similar set of outlet ports 86 at a point about intermediate of the length of the cylinder 38 where a channeled nozzle ring 87 extends around the exterior of the cylinder and merges into a nozzle receiving socket 88 in which is fitted a nozzle 89 of the form particularly shown by Fig. 16 and having an angularly cut opening which is positioned close to the blades 9 of the adjacent turbine 8 so that the kinetic energy generated within the combustion chamber may be delivered with force to the turbine blades. Owing to the tangential or angular arrangement of the ports 85 and 86 and the position of the channeled ring 87 thereto as well as the angular disposition of the nozzle 89 relatively to the blades, quick liberation of the heated motive agent from the combustion chamber 77 and a strong impacting delivery thereof relatively to the turbine blades are effected. One of the openings or ports 85 is also adapted to aline with and expose the active extremity of a sparking plug 90 to the combustion chamber 77 to fire or explode the charge in the latter, the said sparking plug being located adjacent to the outer end of the cylinder 38, as clearly shown by Figs. 2 and 2ª, and this exposure of the sparking plug to the interior of the combustion chamber 77 is effected after the compression of each charge in the said combustion chamber is completed and the valve 81 is closed. The nozzles 89 extend into recesses 91 formed in the inner housing plate 35 and each of these recesses has an opening 92 close to and directly opposite the intermediate portions of the blades 9 of the adjacent turbine 8. It will also be understood that the pistons 70 will be provided with suitable packing rings 93 for setting up a tight working association of the pistons and cylinders.

As hereinbefore indicated, the valves 48 and 64 are positively opened or are under mechanically controlled mechanism which is actuated to supply the several cylinders in cycling sequence with charges of air and gas in proper proportions, preferably at about eleven to one, and this controlled mechanism or controller for the said valves in turn is operated from the power shaft embodied in each organization or group A and B and in accordance with the speed of rotation of the said power shafts and the load upon the turbine or motor as a whole. The advantages of this mechanical control of the valves 48 and 64 in connection with each cylinder and piston and supply means therefor are that a practical, successive operation and perfect ignition or explosion and combustion of the motive agent may ensue at predetermined intervals without liability of the disadvantages that might result from a supply of the motive agent entering the cylinders at the time that the latter should be inactive or when activity of only a part of the cylinders may be required in proportion to the load on the turbine or motor. By this mechanical control of the valves 48 and 64 the necessity of using intermediate valves between the air and gas supply pipes or conduits and the chambers 55 in the heads 39 is avoided. The preferred mechanical means for directly operating the rock levers 52 and the bell-cranks 68 and included as a part of the controllers, one of which is located at each end of the turbine, consists of a plurality of reciprocating rods 94 and 95 which are arranged in pairs relatively to each cylinder and piston and motive agent supply means therefor and extend radially with relation to the opposite ends of the turbine. The outer rods 94 have their outer ends connected to the bell-cranks 68 and the inner rods 95 have their outer ends connected to the outer extremities of the rock-levers 52. The inner ends of the said rods 94 and 95 loosely extend through suitable wear bushings 96 in the side wall of an inclosure or casing 97 at each end of the turbine and the power shaft 12 of each organization or group A and B projects outwardly through the center of the casing, which in the present instance is provided with a central collar 98 formed as a part thereof and screw-threaded to adjustably receive a cap 99 and an adjusting ring 100. The outer extremity of each shaft engages a thrust bearing 101 mounted in the collar 98 and engaged by the cap 99, said thrust bearing being of an antifrictional type, as clearly shown, and operating to prevent longitudinal movement of the shaft 12 and also to give the latter a practical mounting at its outer extremity. Within the casing 97 an eccentric 102 is disposed and keyed to the shaft 12, as shown by Figs. 2, 2ª, 5 and 8. The eccentric 102 is engaged by a securing cap 103, and mounted thereon is an eccentric ring 104 to which a plurality of piston rods 105 and 106 are connected, the piston rods 105 being movably attached or fulcrumed to the ring 104 and the one piston rod 106 being fixed at its inner extremity to said ring to serve as a supporting leg to keep the eccentric ring in place and also to effect a positive operation of the eccentric and ring relatively to the several piston rods. The end closing plate or disk 107 is comprised in the organization of the casing 97 and therefrom the collar 98 centrally projects, and extending inwardly from the plate or disk 107 is an annular flange or seat 108 on which a shifting disk or annulus 109 is movably mounted and serves the double purpose of a trunnion support and as a means for moving the devices directly coöperating with the inner ends of the pairs of rods 94 and 95 out of and into full actuating position relatively to said rods. In the present instance this direct operating means for the rods consists of pairs of cylinders 110 and 111, each two cylinders of the pairs being individually equipped with pistons 112 and 113 respectively. There is a pair of cylinders 110 and 111 with their pistons 112 and 113 for each pair of rods 94 and 95, and both pistons of each pair of cylinders are unitedly reciprocated by a single piston rod 105 or 106. The outer ends of the piston rods 105 and 106 are attached to the centers of the inner ends of the pistons 112 and 113 by trunnion rods 114, the two cylinders being divided by a central partition 115 having an inner slot 116 to provide a clearance for the movement of the outer end of the piston rod working therein. It will be seen that each pair of pistons 112 and 113 is given an equal inward and outward stroke in accordance with the operation of the eccentric 102 and the eccentric ring 104 to which the inner ends of the piston rods 105 and 106 are connected. Each pair of cylinders 110 and 111 with their pistons 112 and 113 is independently fulcrumed by means of an outer trunnion 117 engaging the shifting disk or annulus 109 and also by an elongated trunnion 118 at a diametrically opposite point projecting inwardly from the inner cylinder 111 and extending through a bearing 119 constituting a part of a magnet frame 120 having a hub 121 fitted over the elongated bearing sleeve 13 for the shaft 12, the said frame 120 and its hub 121 having a fixed position relatively to the sleeve 13. Through the medium of the trunnions 117 and 118 extending respectively from the outer and inner portions of the cylinders 110 and 111, the latter with their pistons may be rocked so as to change the position of the outer ends of the pistons relatively to the inner ends of the rods 94 and 95 loosely projecting through and reciprocating in the casing 97. The outer end of each piston 112 is formed with a boss or projection 122 having a cross-sectional extent of reduced proportions or adapted to entirely clear the end of the rod 94 coöperating therewith and actuating the gas admission valve 64. The outer end of each piston 113 has a boss or projection 123 which has a greater cross-sectional extent than the boss or projection 122 or is practically conical and is adapted to coöperate with the inner end of one of the rods 95 which actuates the corresponding rocking lever 52 and opens the valve 48 related thereto through the push-pin engaging the stem of the valve, as hereinbefore explained. The difference in the cross-sectional extent of the bosses or projections 122 and 123 as just explained is very advantageous in accomplishing a desired operation or in insuring the admission of limited quantities of air into the several cylinders 38 of the group of cylinders which may be inactive so as to materially assist in cooling the said cylinders. This operation is obtained when the pairs of cylinders 110 and 111 are shifted relatively to their rods 94 and 95 by reason of each rod 95 engaging a portion of its boss or projection 123 at a distance inwardly from the apex of said projection so that when the piston 113 is reciprocated it will correspondingly push the rod 95 to a less extent than the maximum actuation of the said rod when the piston 113 is in normal position relatively to the rod, and hence the valve 48 will be slightly opened and a small quantity of air permitted to enter the corresponding cylinder 38 for the purpose above explained. The pairs of cylinders 110 and 111 may be individually or as an entirety shifted outwardly from and into full operating position relatively to the rods 94 and 95 as hereinbefore indicated. Extending inwardly from the top portion of each trunnion bearing 119 is a supporting pin or arm 124 having its inner extremity slotted as at 125 and provided with a set-screw 126 to receive and hold one end of a flat spring 127. As heretofore indicated, the trunnion 118 projects through the bearing 119 and is reduced at its inner extremity to form a rock-extension or arm 128 on which is mounted an eye or collar 129 formed at one end of an armature 130 provided at its opposite end with a head 131 and intermediately engaged by the spring 127, a suitable link or yoke 132 being connected to the intermediate portion of the armature 130, as clearly shown by Fig. 7, and having its outer extremity engaged by the said spring 127. The armature 130 has a stop extension 133 extending from the collar 129 and provided with an adjusting stop screw 134 to engage an adjacent portion of the magnet frame to limit the upward movement of that portion of the armature projecting from the opposite side of the collar and carrying the head 131. The armatures are six in number and are mounted to coöperate with electromagnets 135 held by the frame 120 and having their inner ends provided with dovetail extensions 136 to engage dovetail seats 137 formed in the part of the hub 121 or a device that may be mounted on the latter. The magnets 135 are held in fixed position and have their outer poles 138 in alinement for coöperation with the heads 131 of the armatures 130. The electromagnets are arranged in pairs or every six groups or pairs of the magnets and the heads of the armatures 131 are of such dimensions as to bridge and coöperate with the pole pieces or poles of the pairs of electromagnets. In other words, one armature is affected by the pole pieces of two electromagnets after the manner of the usual form of electromagnet organizations for the purpose of setting up sufficient magnetism to quickly and positively operate the armatures when the electromagnets are energized. It will be understood that there should be sufficient magnetic strength to reliably operate the pairs of cylinders 110 and 111 and their pistons 112 and 113 in shifting the individual pairs of pistons out of and into coöperative engagement with the rods 94 and 95 in accordance with the requirements of the load on the motor, and such shifting movement of the individual pairs of cylinders 110 and 111 and their pistons will be independent of the shifting movement of the pairs of cylinders as a whole through the medium of the shifting disk or annulus 109.

Mounted in operative connection with one end of the turbine or motor is a governor 139 of the usual form of centrifugally acting ball type and embodying a stem or shaft 140 with a sliding member 141 thereon which rises and falls through the action of the governor balls to which it is connected and engaged by the short arms 142 of a bell-crank yoke 143 fulcrumed on a bracket 144 secured to a fixed part of the governor below the member 141, the bell-crank yoke having longer arms 145 extending downwardly at an angle and movably connected to the upper ends of rigid links 146 and 147. The stem or shaft 140 is rotated by suitable means through a belt pulley 148 having a belt 149 trained thereover and also over a corresponding pulley 150 secured on an outwardly projecting portion of one of the power shafts 12. By this means the governor may be set to control a predetermined speed of the power shafts 12 of the turbine and prevent racing as well as regulate the speed of rotation of said shafts relatively to the load on the motor, as will be more fully hereinafter explained. Below the base of the governor stand is a pair of timers, one for each side of the machine, and electrically connected to a source of current or to magnetos 151, there being two of the magnetos which are supported on brackets 152 projecting outwardly from one end of the machine on opposite sides of the center of the latter and adjacent to the casing 97. These magnetos are actuated by shafts 153 extending into the adjacent end of the turbine and mounted on suitable bearings, each shaft having a gear 154 on its inner end meshing with an idler pinion 155 carried by a part of the frame, and both pinions 155 are held in continual mesh with and operated by a gear 156 fixed on the shaft 12, as clearly shown by Fig. 2ª. The timers 157 and 158 are of duplicate structure and differ from the ordinary timers, as illustrated in detail by Figs. 13 and 14, the difference in construction being that each timer in the present instance embodies a half conducting segment 159 and a half insulating segment 160 which are mounted within a casing or inclosure 161 supported by a suitable frame 162 fixed on a bracket 163 projecting from the end of the turbine inclosure or a portion of the turbine frame. Between the segmental conducting strip 159 of each timer and the casing is an insulating segment 164, and connecting with the conducting segment 159 is the stem 165 of a binding post 166, as clearly shown by Fig. 13. A common shaft 167 mounted in suitably supported bearings 168 projects into and through the timers 157 and 158 in central relation to the latter and on the opposite extremities of the said shafts, collars 169 are fixed and have arms 170, one for each; and to these arms, carriers 171 are pivotally mounted and have rollers 172 at their outer ends which are adapted to alternately engage the conducting segments 159 and the insulating segments 160 in view of the fact that the arms 170 and carriers 171 revolve at the same rate of speed with the shaft. Each arm 170, carrier 171 and roller 172 is disposed in a reverse position in the respective timers 157 and 158, or when one is uppermost and in engagement with the conducting segment 159 the other is projected downwardly and engages the insulating segment 160, as clearly shown by Figs. 13 and 14. The rollers 172 are held in engagement with the segments 159 and 160 by springs 173 secured to the collars 169 and extending over and engaging and secured to the outer portions of the carriers 171 adjacent to the fulcrums of the latter and tending to exert a resilient pull on the rollers to maintain the latter in their operative engagement with the said segments 159 and 160. The segments 159 and 160 always remain the same as to proportions relatively to any number of cylinders and pistons that may be used in each organization A and B of the turbine, and it will be understood that when the cylinders and pistons are varied in number in each group the time of operation of the roller 172 will be correspondingly modified through the operating means therefor. In the present instance the conducting segments 159 of each timer is of sufficient length to permit all six of the groups of cylinders and pistons in each organization A and B to remain active, provided the full power of the machine is required for the load thereon, and irrespective of the load the sparking plugs of the cylinders which may be thrown out of commission by means which will be hereinafter explained remain active, as no irregular explosion would occur in the out-of-commission cylinders and pistons by reason of the fact that at such time no charges of motive agent will be supplied to such cylinders and pistons. The shaft 167 projects outwardly beyond the outer cover plates or disks 174 of the timers, and the ends thereof are provided with contact posts and disks 175 fitted in collars 176 and adapted to receive contact jacks or couplings 177 of conductors or wires 178 leading to the magnetos. The cover plates or disks 174 with their collars 176 are held intact with the bodies of the timers by spring-engaged nuts 179 on screwposts or rods 180 for maintaining the proper pressure on and freedom of operation of the rollers within the timers. The timers as a whole are also held in steady relation to the shaft 167 or prevented from having shifting movement around the opposite extremities of the shaft through the medium of angle arms 181 secured to the bracket 163 by suitable screws 182, as clearly shown by Fig. 9. On the center of the shaft 167 is a worm wheel 183, and in suitable bearings 184 below said worm wheel a shaft 185 is mounted and has a worm 186 thereon which continually meshes with the said worm wheel. The shaft is also supported by a bracket arm 186 and on the outer end thereof is a pulley wheel 187 over which a belt 188 is trained and also over a pulley wheel 189 fixed on the projecting extremity of the shaft 12 at the governor end of the turbine or motor, and by this means the worm shaft 185 is regularly rotated from the power shaft and through the worm gear 183 the shaft 167 is also rotated in proper timed relation to actuate the rollers 172, carriers 171, arms 170 and collars 169 within the timers 157 and 158. Adjacent to each timer and also supported on the bracket 163 in fixed position is a vertically disposed electromagnet 190 having a pole 191 rising therefrom, these electromagnets being independently active and each energized from the timer adjacent thereto by a wire 192 connected to the binding post 166 through the medium of a suitable coupling or jack, as shown. Mounted on the timer frame and also supported by the bracket 163 is an inclosing casing 193, and in the base of this casing and the upper portion of the timer frame a rock-shaft 194 is disposed in suitable bearings in a plane at right angles to the shaft 167 and extends outwardly through the base of the casing and continues across to the other end of the turbine or motor. The shaft 194 at one extremity has a toothed segment 195 fixed thereon and projecting upwardly within the casing 193 and is held in continual mesh with a segmental gear 196 fixed on a shaft 197 also extending outwardly through opposite ends of the casing 193 and into and through the centers of the oppositely disposed conjointly operating members of a regulator. The regulator members consist of two circular casings 198 and 199, each of which embodies an insulating ring or annulus 200 preferably formed of fiber and secured to an inner inclosing disk or plate 201 which is comprised within the organization of the casings 198 and 199, the said disk and ring or annulus being shiftable in a circular plane through the medium of the links 146 and 147 which are eccentrically attached to the disks or plates 201. Extending inwardly through the peripheries of the casings 198 and 199 are the stems 202 of binding posts 203, the said stems terminating in contacts 204 which have their inner ends exposed through and flush with the inner peripheries of the rings or annuli 200, all of said contacts 204 being of equal dimensions and having exactly similar portions thereof exposed for engagement with co-operating means for establishing a circuit through each binding post. On the opposite extremities of the shaft 197 within the casings 198 and 199 spiders 205 are fixed and consist of a plurality of radial socket arms 206, and in these arms stems 207 are mounted and carry shoes 208, 209, 210, 211, 212 and 213 on their outer ends respectively. Between the inner ends of the stems 207 and the inner terminals of the sockets of the arms 206, springs 214 are introduced to force the stems and shoes outwardly to always maintain a yielding engagement between the shoes and the inner peripheries of the rings or annuli 200 and the contacts 204. The shoe 208 of each member of the regulator is the smallest, and the shoes 209, 210, 211, 212 and 213 increase in dimensions, said dimensions being predetermined in accordance with the operation desired or so that when the governor 140 through the links 146 and 147 shifts either regulator member, ring or annulus 200 to automatically regulate the turbine or motor in accordance with the load thereon or when the shaft 197 is positively operated to throw all of the shoes of one regulator member off and on the contacts 209 the several shoes will become engaged with and disengaged from the contacts at different intervals of time proportionately to the dimensions of the several shoes. The shoe 213 which is of maximum dimensions will be the last to become disengaged from its contact and the first to engage said contact, and the next shoe 212 of less dimensions will move to and from its contact before the operation of disengagement and engagement of the shoe 213 relatively to its contact has been effected, and so on around through the whole series of shoes to the shoe 208 of minimum dimensions, which will always be the first to become disengaged from its contact and the last to engage said contact. Therefore, when the governor 140 through the links 146 and 147 operates to shift the spiders 205 a disengagement of the shoes from a normal, full engaging position will be effected by the abnormal operation of the governor in accordance with the variations of load on the turbine or motor and the shoes of shorter dimensions will become disengaged from their contacts, whereas the shoes of longer dimensions will remain in engagement with their contacts so that a part of the electric circuits will be broken and a portion of the said circuits remain continuous. The shaft 167 of the timer has its opposite extremities electrically connected by a suitable wire 215 with the shaft 197 of the regulator organization and the binding posts 203 are six in number in the present instance and are electrically connected by suitable wires 216 with the pairs of electromagnets 135, a wire leading off from the wire 215, as at 217, to the source of electrical generation. It will therefore be seen that including the electrical connections or wires 192 between the timers and the magnets 190 and the electrical connections between the regulator organization and the electromagnets 135, the said timers and regulator organization and electromagnets will operate as an electrical unit. Owing to this electrical operation of the parts just mentioned, the modification of the contacts in the members of the regulator organization will instantly vary the circuits between the same and the electromagnets 135 and a part of the groups or pairs of cylinders 110 and 111 with their pistons 112 and 113 will be rocked or thrown out of or into commission relatively to the corresponding rods 94 and 95 and cut off or supply the motive agent to the cylinders 38 and pistons 70 controlled by the rods 94 and 95 and the valves coöperating therewith affected by the movement of the pairs of cylinders 110 and 111 and the pistons therein. Primarily the spider 205 and stems 207 carrying the shoes 208 to 213, inclusive, of one regulator member will be set completely off the contacts 204, as shown by Fig. 11, and the spider and shoes of the remaining member of the regulator will be shifted so that the shoes will engage the contacts 204, and the sets of six cylinders and their pistons controlled by the regulator member having the shoes in engagement with the contacts 204, and under such conditions in circuit with the electromagnets 135, will be regularly charged with the explosive agent and the sparkers of this group of cylinders will be active; whereas the cylinders and pistons corresponding to the remaining member of the regulator, wherein the shoes are out of engagement with the contacts 204, will be inactive so far as the supply and explosion and combustion of the motive agent relatively thereto is concerned. As hereinbefore indicated, electromagnets 190 having upwardly extending poles 191 are located adjacent to the timers, and operatively arranged over the poles 191 are armatures 218 and 219 on the outer ends of arms 220 projecting from opposite portions of the rock-shaft 194 for actuating the latter shaft, the segment 195, the segmental gear 196 and the shaft 197. As shown by Fig. 9, one of the armatures 218, for instance, is shown down or in attracted relation with respect to the pole piece 191 of the magnet 190 beneath the same, and the adjacent timer is electrically operating or the roller 172 thereof is in engagement with the conducting segment 159, and during this position of the armature 218 the shaft 197 will remain fixed. As soon as the roller 172 in the timer adjacent to the armature 218 rides or moves off the conducting segment 159 onto the insulating segment 160, the corresponding roller of the opposite timer will have moved from the insulating segment 160 onto the conducting segment 159 and instantly the electromagnet 190 adjacent to the previously operating timer will become deënergized and the remaining electromagnet energized and draw down the armature 219, thus rocking the shaft 194 and through the segment 195 and segmental gear 196 the shaft 197 will be correspondingly moved to change the position of the spider arms and shoes 208 to 213 inclusive carried thereby so that the said shoes of the one regulator member which have been bearing solely on the insulating ring or annulus 200 will be brought into engagement with the contacts 204 and the shoes of the opposite regulator member will be disengaged from their contacts 204. It will be understood, however, that if the governor 140 has operated as hereinbefore explained to partially shift the shoes 208 to 213, inclusive, from the contacts 204 of the active member of the regulator, a corresponding shifting of the shoes relatively to the contacts will take place in the remaining member of the regulator through the change of position of the armatures 218 and 219 and the electrical activity of the timers. The change of position of the armatures 218 and 219 owing to the completion of the electrical contact of the roller 172 in one timer with its conducting segment 159, will be effected only when the cylinders and pistons 38 and 70 of one group have completed their cycle of operations relatively to the admission, explosion and combustion of the motive agent thereto, the change of operation from one side to the other taking place without loss of time or by a slight overlap so that there will not be the least fluctuation of interval of diminution of driving force relatively to the turbine shaft and the power shafts geared thereto. The shaft 194, as heretofore stated, extends across from one end of the turbine or motor to the other end thereof and is held in suitable bearing brackets 221 fixed to the upper outer portions of the frame of the turbine or motor at opposite extremities of the latter, and on the ends of this shaft are cranks 222, as shown by Figs. 2, 2ª and 4. To each of the cranks 222 a rigid connecting rod 223 is secured and also movably attached to the shifting disk, plate or annulus 109 by means of a pin 224 extending through a slot 225, as shown by Fig. 8, this attachment of each connecting rod 223 being similar at opposite ends of the turbine or motor. Thus it will be seen that when the shaft 194 is rocked or shifted, its motion is imparted through the connecting rods 223 to the shifting disks or annuli 109, and the pairs of cylinders 110 and 111 with their pistons 112 and 113 therein, together with the electromagnet organization adjacent to said cylinders, are bodily shifted so as to move the pistons 112 and 113 at one end of the turbine or motor to disengage all of the projections 122 of the pistons 112 from the ends of the rods 94 and partially disengage the projections 123 of the pistons 113 from the inner ends of the rods 95, and conversely at the opposite end of the turbine or motor the projections 122 and 123 of the pistons 112 and 113 are brought into full engagement with the inner ends of the rods 94 and 95 adjacent thereto. The electromagnet frame 120 and the electromagnets 135 and armatures 129 are permitted to move in unison with the pairs of cylinders 110 and 111 and the pistons in the latter through the medium of the sleeve 121 of the magnet frame having loose engagement with the elongated sleeve or hub 13 at each extremity of the turbine or motor, and it is obvious that such movement of the magnet frame and its magnets together with the armatures is necessary in view of the bodily shifting movement imparted to the cylinders 110 and 111 and their pistons. This bodily shifting movement of the cylinders 110 and 111 together with their pistons or the individual movement of the pairs of cylinders 110 and 111 is not in the least restricted by the piston rods 105 because the latter are trunnioned at their inner ends and are consequently fulcrumed, and though these piston rods may be temporarily disposed at angles to two radial lines, they will continue to operate the pistons 112 and 113 in the cylinders 110 and 111 through the eccentric and eccentric ring hereinbefore described and by this means the pistons 112 and 113 will always be in condition for instantly engaging the inner ends of the rods 94 and 95 corresponding thereto through the bosses or projections 122 and 123 when the cylinders 110 and 111 are shifted into normal positions relatively to the said rods.

The partition 7 divides the exhaust chambers 226 each having an outlet 227 communicating with a common exhaust pipe or conduit extending out to the base of the machine and of any preferred type. This partition 7 is made in two sections and is hollow to provide water circulating chambers 228, the chambers of the two sections being connected by a circulating pipe 229, as clearly shown by Figs. 3 and 2ª. The chambers 228 have suitable partitions 230 therein, as shown by Fig. 3, to set up a positive circulation of water or other cooling medium which is fed into the bottom of one chamber by a pipe 231 connected to a supply pipe 232, which in turn is fed by a suitable conduit, not shown, leading from a reservoir or other supply means. By means of this partition an exhaust chamber is formed for each turbine 8, and into this chamber the heated motive agent after traversing the turbine blades 9 is free to flow and finally passes out through the exhaust opening 227. The cooling partition, as explained, creates a zone of low temperature in which each turbine revolves, and in addition the water jacket extensions 10 surround the turbines in the form of annuli or circumscribing inclosures and are connected by means of pipes 233 with the supply pipe 232, and hence a thorough circulation of the cooling medium or water is set up, not only in the partition 7, but in the circumscribing cooling means for the turbines, and the latter are thereby rapidly reduced in temperature when not engaged by the heated motive agent from the several adjacent cylinders through the nozzles 89. By making the partition 7 in sections, convenience in assembling and disassembling the parts results. It will be seen that the exhaust chambers are surrounded by outer casings 234, as clearly shown by Figs. 2, 2ª and 3, and the bottom portions of these casings may be extended to provide the exhaust outlet or conduit means in any manner desired. The outlet for the water or other cooling medium supplied to the partition plate 7 and the water chamber extensions or annuli 10 surrounding the turbines 8 consists of a pipe 235, as shown by Fig. 1, and to which a suitable drain pipe may be attached.

The air and gas chambers 58 and 60 are connected to supply pipes 238 and 239 respectively connected thereto and in turn run to air and gas supply means, and as hereinbefore indicated the air may be under pressure or simply under atmospheric pressure. To preliminarily start the turbine or motor prior to the time that the cycling feed of the air and gas to the several cylinders 38 is effected or start the turbines to rotate in order that the first charges of motive agent delivered thereto may regularly continue the turbine rotation, an air pressure pipe 240 is connected to the casing adjacent to the turbine at each side of the machine and delivers air under compression to the turbine at two points at both ends of the machine, the compressed air being fed to the pipes 240 from a suitable source. After the turbines have been thus preliminarily started, the pipes 240 are closed by means of valves 241 so as to obstruct any tendency to interference with the regular discharging of the motive agent into the exhaust chamber and outwardly from the turbine or motor as a whole through the regular exhaust pipe or conduit. The pipes 240 communicate with the opposite portions of the casing adjacent to the turbines between pairs of the cylinders, as shown by Fig. 1, so as to avoid interference with the operation of any of the cylinders in preliminarily starting the turbine.

The base of the machine comprises a main supporting element 242 at the center on which the base 243 of the central portion of the casing is mounted and secured, as shown by Fig. 3, and it is preferred that the exhaust outlet be adjacent to or extend into a portion of the base 243, as at 244, see Fig. 4. It is, of course, obvious that the exhaust outlet 244 as well as the exhaust openings 227 leading thereto should be as large as possible so as to quickly carry off the exhaust from the chambers 226, and it is proposed to increase the diameter of the exhaust means as much as possible within the general proportions of the said chambers 226 and to locate the openings 227 at the lower portions of said chambers. So far as the structure of the base of the turbine or motor is concerned, it may be modified at will, both as to form, general organization and proportions relatively to the remaining parts of the turbine. The present turbine, however, embodies means for rendering the two turbines 8 and the chambers 226 as well as the inner ends of the two organizations A and B readily accessible. To accomplish this desired end, opposite extremities of the main base member 242 are provided with extensions 245, and thereon supports 246 are slidably mounted and secured to the lower portions of the frames or casings 36 of the organizations A and B. Each support 246 has an arm 247 secured thereto and depending through a slot 248 in the top of the extension 245 for said support, the lower end of the arm 247 being formed as a screw-eye 249 to receive the inner screw-threaded extremity of an adjusting screw-rod 250 which is swiveled in the outer end of the extension 245, as at 251, and has a stem 252 angular in cross-section to receive a suitable crank whereby the rod 250 may be rotated in opposite directions. The support 246 is movable regularly in central relation to the top of the extension 245 through the medium of suitable guides 253. By releasing the bolts 254 of the inner casing end or plate 35 of either organization A or B the organization so released may be shifted outwardly from the adjacent turbine 8 and chamber 226 by operating the screw-rod 250, and after repair or other manipulation is completed the organization moved outwardly may be reset in operative position relatively to its turbine 8 and chamber 226 and the securing bolts 254 applied to positively attach the organization in immovable position.

It will also be understood that suitable oiling cups and other accessories ordinarily used with gas turbines or motors will be applied as found necessary and desirable.

The operation of the turbine or motor in view of the foregoing disclosure of the preferred structures and organizations will be as follows:

In starting the turbine or motor, in order to set up a rotation of the turbines 8, the turbine shaft 5 and the power shafts 12, air under pressure is permitted to enter the pipes 240 by opening the valves 241 and after a limited interval or when the controlling and regulating mechanisms start to properly operate to deliver the charges of motive agent to the group of cylinders and pistons which will be first active, the air is shut off from the pipes 240 and the valves 241 are closed.

The pistons 70 in the several cylinders 38 are alternately operated to have outward and inward strokes through the medium of the cranks 15 and the eccentric disks 16 thereon located at the center of each group of cylinders and pistons and connected up, as hereinbefore explained, to the piston rods 69. On the instroke of each piston rod and piston 69 and 70 in its cylinder 38 the valve 48 in the outer end of the cylinder is opened to permit the charge of the motive agent or explosive medium to fully fill into the cylinder by the actuation of the push-pin 52 operated by the lever 52ª having the rod 95 connected thereto and reciprocated by the controller mechanism hereinbefore explained. The motive agent or explosive medium flows into each cylinder 38 without the least restriction and the cylinder is thus charged until the piston 70 reaches the innermost limit of its instroke, the valve 81 in the outer end of the piston remaining closed during the charging of the cylinder so that the motive agent or explosive medium will not pass into the combustion chamber 77 of the piston during the inward stroke thereof. The inward stroke of the piston tends to draw the charge of the motive agent or explosive medium into the cylinder in close following engagement with relation to the piston and the slight suction created by the inward movement of the piston holds the loose valve 81 tightly closed to its seat. On the outward stroke of the piston the loose valve 81 will be forced open or inwardly and the charge of the motive agent which has been drawn into the cylinder will be gradually forced into the combustion or explosion chamber 77 and stored under pressure until the piston reaches its outward stroke limit when the crank passes over the center of the shaft 12, and at this time the pressure in the combustion or explosion chamber will be sufficiently strong to close the valve 81 and the charge admitted to the cylinder will have been practically all compressed into the piston or the combustion chamber of the latter. With the inclosed charge under pressure therein the piston returns on its inward stroke until one of the ports 85 alines with the firing port in the cylinder casing where the sparking plug 90 is located, and the charge in the combustion or explosion chamber of the piston is immediately exploded without subjecting the cylinder, piston and correlative mechanism to any undue pressure or friction, and immediately subsequent to the explosion the piston starts on its inward stroke, and during the latter stroke the charge of the motive agent which has been exploded in the combustion chamber is completely burned, the time of movement of the piston inwardly from the sparking plug 90 to the outlet for the burned charge permitting a complete combustion of the motive agent, and during this time the valve 81 is held tightly closed by the pressure within the combustion chamber 77. When the piston about reaches the limit of its inward stroke or when the ports 85 communicate with the nozzle ring 97, the heated motive agent in the combustion chamber is instantly liberated and given a direct delivery to and through the nozzle ring and to the throat of the nozzle 89 and from the latter delivered to the turbine blades 9 of the adjacent turbine 8 to rotate the latter. While each piston is on its inward stroke with the charge of motive agent in exploded and heated condition therein and held against the least escape from the valve 81, the said piston is at the same time drawing in a new charge of the motive agent or explosive medium into the outer portion of the cylinder so that immediately the piston again resumes its outstroke, the combustion chamber will be recharged and the same operation ensue. The indrawing of the successive charges of the motive agent or explosive medium into each cylinder casing operates with a material advantage as a cooling medium relatively to the piston therein and as a consequence effects a reduction of temperature of the piston as a whole and particularly of the combustion chamber 77 forming a part of the piston, particularly in view of the heat non-conducting packings surrounding each cylinder organization and portions of the pistons, and at the same time the temperature of the cylinder is maintained at a comparatively low degree in view of the fact that the explosion and combustion of the motive agent or explosive medium takes place within the piston. Another advantage of this manner of admitting the motive agent or explosive medium to the cylinder and effecting an explosion and combustion within the piston is that all residuum that might otherwise be due to failure to scavenge each cylinder is absent in the cylinder, and, moreover, the motive agent is thoroughly and completely burned and the heated motive agent is wholly liberated and passes out from the piston through the ports 85 into the ring 87 and finally exits through the nozzle 89. Furthermore, by freely charging the several cylinders with the motive agent or explosive medium at the time that the valves 48 are open and without the least restriction to the admission of the motive agent to the cylinders, the said motive agent or explosive medium is more economically and effectively used with greater efficiency as a driving medium for the reason that each charge is completely burned. As hereinbefore indicated, there are at least two groups of the cylinders and pistons, one group being active while the other is inactive, and as heretofore indicated, the cylinders and pistons of each group may be operated as a whole in regular sequence or cycle to produce any number of desired explosions prior to alternation of operation relatively to the remaining group, or the cylinders of each group may be rendered inactive to any extent in compensation of the load on the motor, and at the time that alternation ensues from one group to the other if the load remains the same a similar number of the cylinders of the remaining group will be thrown into action so as to avoid the least fluctuation as to the operation of the power shafts and the turbine or motor as a whole. The springs 50 coöperating with the stems 47 of the valves 48 always tend to seat these valves and hold them seated at intervals between the positive opening of the valves through the levers and push-rods hereinbefore explained, and during the outward strokes of the pistons the charges of motive agent in the cylinders are simultaneously forced into and given a pressure within the explosion or combustion chambers by reason of the fact that the valves 48 are seated and prevent escape of any portion of the charges from the cylinders and the capacity of the cylinders is so proportioned relatively to the capacity of the explosion or combustion chambers in the pistons that the charges in the cylinders will be practically all taken up and forced into the pistons under a high degree of compression prior to the explosion of the charges within the pistons by the exposure thereof to the sparking plugs 90. It will also be understood that more than one cycle of each group of cylinders and pistons relatively to admission of the charges of the motive agent and storage and compression thereof in the combustion chambers of the pistons may ensue prior to a change of activity from one group to the other, and the number of cycles is immaterial so far as the features of the invention are concerned and may be of a large or small number as may be desired and will be proportionate to the time required for one timer to pursue its conducting or circuit making operation before the other timer similarly operates and the active elements of the first timer become dead as to electrical conductivity by engagement with the insulating segment 160. If the load on the turbine or motor remains constant in accordance with the predetermined maximum power, all of the cylinders and pistons of each group will operate in regular cycle or be charged in sequence and discharge the heated motive agent in like manner to the adjacent turbine. If, however, the load on the motor fluctuates, the governor 139 will instantly adjust the regulator organization through the bell-cranks 143 and connecting rods 146 to shift the contacts 204 proportionate to the fluctuation relatively to the shoes 208 to 213 inclusive, and for reasons hereinbefore explained a part of the contacts may be disengaged from a portion of the shoes and thereby cut out the charging of a number of the cylinders and combustion chambers of the pistons with the motive agent through the action of a part of the electromagnets that may be simultaneously affected by the shift and a corresponding rocking of a part of the cylinders 110 and 111 and the pistons 112 and 113 to throw out the projections 122 and 123 from working coincidence with the rods 94 and 95 adjacent thereto, and the said cylinders and pistons thus deprived, for the time being, of regular charges of the motive agent or explosive medium will receive air only in view of the fact that the projections 123 will be in partial engagement with the rods 95. Thus it will be seen that during the interval of inactivity of a part of the cylinders and pistons as to the reception of successive charges of the motive or explosive agent, said cylinders and pistons will be cooled by the incoming charges of air admitted thereto and these charges of air will finally reach the turbine blades 9 of the adjacent turbine 8 and in like manner have a cooling effect on the said blades and turbine. The charges of air thus admitted to portions of the cylinders and pistons as well as the turbines will also operate as a cleaning means for the several parts and prepare the cylinders and pistons for a more perfect operation upon resumption of the full load on the turbine or motor. The moment that the maximum load on the motor is restored, the governor 139 will operate so as to reverse the movement of the parts that have been previously shifted and set up an actuation of the full complement of the cylinders and pistons of each group. Should, however, the alternation of activity of one group relatively to the other that has been acting be effected during the automatic reduction of operation of the cylinders and pistons of each group, the same number of cylinders and pistons will operate in the group becoming active by the alternation in view of the mechanism automatically operating to set the regulator members in consonance to simultaneously throw a portion of the cylinders and pistons in the opposite organizations A and B out of commission relatively to the reception and combustion of charges of the motive agent. After the heated motive agent has performed its function relatively to the turbine blades 9 of the turbines 8, it passes directly into the adjacent exhaust chambers 226 and is immediately liberated through the exhaust openings 227, and likewise the air that passes into those cylinders of each group which are not active as recipients of charges of the motive agent when the load on the motor causes an actuation of the mechanism to throw out portions of the cylinders of each group or to cut off the feed of the motive agent therefrom finally enters the chambers 226 and exits through the openings 227. When one group of the cylinders and pistons is inactive in receiving charges of the motive agent and during the time that the other group is active, the said inactive group of cylinders and pistons continuously receives charges of air by reason of the fact that the valves 48 are slightly opened by the rods 95 which are in partial operative relation to the bosses or projections 123 of the pistons 113 and the admission of air in this manner to the inactive group of pistons and cylinders materially facilitates cooling of the latter and said air ultimately passing into the adjacent chamber 226 also assists the cooling partition 7 and the water jacket surrounding the adjacent turbine 8 in expeditiously reducing the temperature of this turbine and its blades, and this particular cooling operation ensues regularly at opposite sides of the partition 7.

Various changes in the structure of the several elements hereinbefore disclosed may be made within the scope of the invention and especially modifications in the proportions and dimensions of the several parts. The regulator organization has been described as being under electrical control which is preferred so that the mechanism as a whole will be automatic in its operation without requiring any manual control, but in certain classes of gas turbines embodying the features of the invention the automatic effect, in so far as alternation of activity of the opposite groups is concerned, might be accomplished by manual means, and it is proposed at times to utilize manually operated devices for this purpose. Wherever found necessary the joints of parts requiring the introduction of packings or fillings to avoid leakage will be constructed in accordance with approved methods now commonly pursued in gas turbines and analogous machines.

In the present gas turbine the proper proportions of the air and gas always remain at a fixed adjustment, and said proportions are therefore invariably constant. Also, the active combustion chambers in each group are fully charged with the motive agent and are exploded and relieved of the heated motive agent to their maximum capacity. These advantageous characteristics greatly increase the efficiency of the turbine relatively to the use of a lean mixture which invariably ensues from throttling operations now commonly employed in gas engines. It is a well known fact that a gas engine combustion chamber fully charged with a mixture of constant proportions will give a materially greater efficiency than a combustion chamber charged at intervals with a lean mixture, or a combustion chamber partially charged. For instance, six 10 H. P. gas engines working at full load will give the same efficiency as a 60 H. P. gas engine working at full load, but if the load drops off 50% and the governor automatically cuts out three of the 10 H. P. engines, a much higher efficiency results from the three 10 H. P. engines than would be possible to derive from the 60 H. P. engine running at half-load.

What is claimed is:

1. In a gas turbine, power generating turbines, separate groups of active elements coöperating therewith, and automatically operating shifting devices having actuating electrical means for alternately supplying and shutting off the motive agent to and from the said groups of active elements and for rendering the individual units of the groups active and inactive.

2. In a gas turbine, power generating turbines having separate groups of active elements, automatically operating shifting devices having actuating electrical means for alternately supplying the heated motive agent to and from the turbines and for automatically shutting off the motive agent from the separate groups and for rendering the individual units of the groups active and inactive.

3. In a gas turbine, revolubly active turbines alternately operating as power generating means, groups of cylinders and pistons independently coöperating with the turbines, and automatically shifting devices having actuating electrical means for delivering unrestricted charges of a motive agent in succession to the cylinders and operating to supply and shut off the motive agent to and from the groups to render one group active while the other is inactive, the motive agent being held inclosed and burned in the pistons while the cylinders are receiving new charges.

4. In a gas turbine, the combination with power generating turbines having groups of cylinders with single pistons therein having combined compression and combustion chambers therein, means being provided in the pistons for automatically closing the chambers thereof during instrokes of the pistons, of automatically operating electric means for alternately supplying and shutting off the motive agent to and from the cylinders and pistons.

5. In a gas turbine, power generating turbines, groups of cylinders with single pistons therein having combined compression and combustion chambers therein independently coöperating with the turbines, and electric means for automatically supplying and shutting off the motive agent to and from the groups in alternation, said electrical means including pairs of uniformly shifting devices, the motive agent being stored under pressure in the piston chambers by the outward movement of the pistons in the cylinders.

6. In a gas turbine, power generating turbines, groups of cylinders independently coöperating with the power generating turbines, pairs of shifting devices having actuating electric means for automatically supplying and shutting off the motive agent to and from the groups in alternation, pistons reciprocatingly mounted in the cylinders and provided with combined compression and combustion chambers automatically operating to receive, store and retain the charge of motive agent under compression during their outward stroke, and means for igniting each charge and for detaining the exploded charges during the inward strokes of said pistons for the purpose of giving sufficient time for complete combustion of the charges before delivery thereof to the power generating turbines.

7. In a gas turbine, power generating turbines, groups of cylinders and pistons independently coöperating with the turbines, automatically operating pairs of shifting devices having actuating electric means for alternately supplying and shutting off the motive agent to and from the groups of cylinders and pistons, and ignition means, the pistons being provided with combustion chambers in which the motive agent is stored under pressure on the out-stroke of the pistons and exploded at a predetermined time on the in-stroke of the pistons without shocking or straining the power generating means.

8. In a gas turbine, power generating turbines, groups of cylinders and pistons independently coöperating with the turbines, the motive agent having a cycling operation with relation to said cylinders and pistons, automatically operating pairs of shifting devices having actuating electric means for alternately supplying and shutting off the motive agent to and from the groups of cylinders and pistons, and ignition means, the charge of the motive agent being drawn into the cylinders by the in-stroke of the pistons and the latter having chambers wherein the motive agent is stored under compression during the out-stroke of the pistons and exploded at a predetermined time on the in-stroke, the motive agent being thus delivered in an effective elastic condition to the turbines.

9. In a gas turbine, power generating turbines having groups of cylinders and pistons coöperating therewith, the pistons being provided with combined compression and combustion chambers therein, and independent shifting devices for the individual cylinders and pistons of each group having actuating electrical means for automatically supplying and shutting off the motive agent to and from the groups.

10. In a gas turbine, separate rotating turbine means, cylinders and pistons coöperating with said turbine means and provided with ignition means, each piston being provided with an automatically opening and closing combined compression and combustion chamber which is charged by the out-stroke of the piston and closed by the pressure within the latter prior to the explosion, the chamber having an automatically operating loosely mounted valve opened by pressure in the cylinder in which the piston is mounted and closed by the pressure within the piston chamber, a time interval given on the in-stroke for a more complete combustion and delivering the motive agent to the turbine rotors at a high spouting velocity, and shifting means for each cylinder for automatically supplying and shutting off the motive agent relatively to all of the cylinders and pistons in sequence.

11. In a gas turbine, rotating turbine elements, groups of cylinders and pistons adjacent to the turbine elements for supplying the latter with heated motive agent, each cylinder and piston having angularly disposed ports and each cylinder provided with an encircling ring having an annular channel from which a nozzle directly and tangentially extends and terminates adjacent to the turbine means, and means for electrically supplying and shutting off the motive agent to and from the cylinders and pistons.

12. In a gas turbine, rotating turbine means, groups of cylinders and pistons adjacent to the turbine means for delivering a heated motive agent to the latter, each piston having an automatically opening and closing chamber into which the motive agent is forced, exploded and consumed during movement of the piston, the pistons and cylinders having angularly disposed ports, and the cylinders encircled with channeled rings terminating in nozzles adjacent to the turbine means for giving the heated motive agent positive liberating movement from the cylinders and pistons, and electric means for automatically supplying and shutting off a motive agent to and from the cylinders and pistons.

13. In a gas turbine, rotating turbine means, a motive agent controlling cylinder adjacent to the turbine means and having a single reciprocating piston therein, the charges being automatically received and stored temporarily in the piston and exploded and burned in the piston without leaving residuum in the cylinder, air supply means for the cylinder, and shifting devices for alternately admitting and shutting off the motive agent and air relatively to the cylinder and provided with electrical means for actuating the same.

14. In a gas turbine, the combination with rotating turbine means, of piston means provided with chambers which are automatically charged with a motive agent during the movement of the piston means and also with means for inclosing the said charge and effecting an explosion within the piston means, the motive agent being fully consumed within the piston means prior to delivery to the turbine means, and electrically operated means for supplying motive agent to the piston means.

15. In a gas turbine, the combination with rotating turbine means, a plurality of cylinders, a plurality of single acting pistons therein, each provided with a motive agent receiving chamber at the outer end thereof wherein the motive agent is stored under pressure, each piston also having an automatically operating intake and closing valve for holding the charge under combustion in the piston until the latter has reached the limit of its in-stroke without putting any undue pressure or shock on the rotating turbine means.

16. In a gas turbine, the combination with rotating turbine means, of a plurality of pistons having chambers at their outer ends, and electrically operated means for supplying the pistons with a motive agent, the motive agent being charged into the pistons and exploded and wholly consumed during the movement of the latter.

17. In a gas turbine, the combination with rotating turbine means, of a plurality of groups of pistons having chambers opening out through outer ends thereof and provided with automatically opening and closing means, and electrically operated means for alternately supplying the groups of pistons with a motive agent.

18. In a gas turbine, the combination with rotating turbine means, of groups of pistons operatively disposed adjacent to said turbine means and each having a chamber in the outer end thereof and provided with a loose valve controlling the automatic opening and closing of the chamber by the pressure exterior of and within the chamber, and electrically operated means for alternately supplying and shutting off a motive agent relatively to the groups of pistons.

19. In a gas turbine, the combination with power generating means, of cylinders having therein reciprocating pistons adjacent to and coöperating with said power generating means, each piston being provided with an automatically opening and closing chamber at the outer end thereof for the reception, explosion and combustion of a motive agent, and electrically operated means for supplying and shutting off the motive agent relatively to the pistons.

20. In a gas turbine, power generating means, a plurality of cylinders and pistons adjacent to and coöperating with the power generating means, the pistons having chambers opening through and located at the outer ends thereof for receiving, exploding and consuming a motive agent and operating to draw the motive agent into the cylinders while a charge in each piston is being consumed to cool the cylinders and pistons, and electrically operated means for supplying a motive agent to the cylinders and pistons.

21. In a gas turbine, the combination with rotary power generating means, of a plurality of cylinders and pistons adjacent to and coöperating with said means, chambered heads on the outer ends of the cylinders having time operated valves controlling communication with the cylinders, pairs of joined air and gas feeding pipes connected to the heads, valves controlling the passage of the gas from the gas feeding pipes into the air feeding pipes in proper proportion, means for opening the valves in the heads and the gas feeding valves at intervals, and electrically operated means for controlling the operation of the said valves of the air and gas feeding pipes.

22. In a gas turbine, the combination with rotary power generating means, of a plurality of cylinders and chambered pistons with automatically opening and closing valves, the cylinders and pistons being adjacent to and coöperating with said means, chambered heads on the outer ends of the cylinders having positively actuated valves to set up communication of the chambers of the heads with the cylinders, pairs of joined air and gas feeding pipes connected to the heads, valves controlling the passage of the gas from the gas feeding pipes into the air feeding pipes in proper proportion, means for opening the valves in the heads and the gas feeding valves at intervals, and electrically operated shifting means for supplying the air and gas feeding pipes with air and gas.

23. In a gas turbine, power generating means, a plurality of cylinders and pistons adjacent to and coöperating with said means, chambered heads on the outer ends of the cylinders having positively actuated valves setting up communication of the chambers with the cylinders at intervals, air and gas feeding pipes communicating with the cylinders and continuing into air feeding pipes alone, gas feeding pipes intersecting the air feeding pipes and provided with valves at a distance from the point of attachment of the air and gas feeding pipes with the heads, and electrically operated mechanism for controlling the inlet of the air and gas in proper proportions into the cylinders and including oscillating operating means to alternately open the gas and air pipes to the said cylinders.

24. In a gas turbine, the combination with power generating means, of cylinders adjacent to the said power generating means and having communication with the latter, electrically operated means for charging the cylinders with a motive agent, and reciprocating means in the cylinders provided with chambers at their outer ends and automatically operating valves, the chambers receiving the full charges in the cylinders and compressing the charges by the reciprocation of the pistons, and exploding the compressed charges and wholly consuming the exploded charge, the pistons and cylinders having coinciding outlet means relatively to the power generating means.

25. In a gas turbine, the combination of operatively connected rotating turbine means, groups of cylinders and pistons with chambers in their outer ends and located adjacent to and independently coöperating with the turbine means, and electrically operated means for feeding gas and air alternately to the cylinders and pistons and also for feeding air alone to the cylinders and pistons for cooling the latter at intervals when the air and gas are shut off from the groups of cylinders and pistons.

26. In a gas turbine, the combination with rotary power generating means, cylinders and pistons adjacent to and coöperating with the rotary power generating means, and electrically operated means including valves and pairs of shifting devices for supplying the cylinders and pistons with an explosive motive agent or with air alone to cool down the cylinders and pistons and assist in cooling the power generating means when the motive agent is shut off from the cylinders and pistons.

27. In a gas turbine, the combination with rotary power generating means, cylinders and pistons adjacent to and coöperating with the said power generating means, and electrically operated mechanism including valves and pairs of shifting devices controlling the same for charging the cylinders and pistons with a motive agent and shutting off the latter therefrom and in part operating to feed air to the cylinders and pistons when the motive agent is shut off.

28. In a gas turbine, the combination with power generating means, of a plurality of cylinders and pistons adjacent to and coöperating with said means, and electrically operated means for supplying and shutting off a motive agent relatively to the cylinders and pistons, the said electrically operated means including pairs of shiftable devices controlling the admission openings to the cylinders and pistons, a cooling medium being fed into the cylinders and engaging the pistons when the motive agent is shut off and passing from said cylinders and pistons to the power generating means to assist in cooling the cylinders and pistons and said power generating means.

29. In a gas turbine, the combination of power generating means, a cylinder adjacent to said means and in communication therewith, the chamber having motive agent and air inlet means at its outer portion, and a reciprocating device in said cylinder and having a chamber in its outer extremity to receive the motive agent and air and for storing and holding the said agent under combustion excluded from the cylinder, and delivering the motive agent in heated condition through the cylinder to the power generating means.

30. In a gas turbine, the combination with power generating means, of radially reciprocating chambered means for receiving and automatically inclosing and consuming charges of motive agent therein and delivering the consumed agent with a propulsive movement to the power generating means.

31. In a gas turbine, the combination with power generating means, of radially reciprocating chambered means for receiving and automatically inclosing and consuming a charge of motive agent therein and electrically controlled devices for supplying cooling charges of air to the said chambered means at intervals when the latter means is not being charged with the motive agent, the charges of air being liberated from the chambered means and passing to the power generating means.

32. In a gas turbine, the combination with power generating means, of a cylinder having radially movable means having a chamber at its outer extremity open at intervals directly to the cylinder and provided with electrical devices for supplying and shutting off charges of motive agent thereto and also for feeding cooling charges of air thereto when the motive agent is cut off, the chamber in turn delivering the charges of motive agent and air to the power generating means.

33. In a gas turbine, the combination of rotary turbines alternately operating as power generating means, groups of cylinders having therein radially movable means provided with chambers in their outer ends coöperating with said turbines for preparing and delivering charges of heated motive agent and charges of cooling air alone to the turbines in alternation, and electrical means for independently feeding and shutting off charges of motive agent and air at intervals relatively to the groups of chambered means respectively.

34. In a gas turbine, the combination with power generating means, of a receptive means provided with electrical devices for feeding charges of motive agent thereto, and a progressively movable element having a chamber in its outer end and disposed in the receptive means and operating in one direction to automatically store the motive agent charges therein under pressure and explode said agent and permitting the agent to fully burn and produce heated motive agent during an opposite direction of movement, the heated motive agent charges being delivered from the movable element to the power generating means.

35. In a gas turbine, the combination of a turbine shaft having turbines thereon, mechanism including pistons and cylinders for feeding a motive agent to the turbines, and power shafts for actuating said pistons and having cranks connected to the pistons and provided with antifrictional rotating bearings at the inner extremities thereof for the ends of the turbine shaft to permit the turbine shaft to run free at a rapid rate without affecting the power shafts by contact therewith.

36. In a gas turbine, the combination of a turbine shaft having turbines thereon, mechanism including pistons and cylinders for feeding a motive agent to the turbines, and power shafts for actuating said pistons and having cranks connected to the pistons and provided with antifrictional rotating bearings at their inner extremities for the opposite ends of the turbine shaft to permit the turbine shaft to run free at a rapid rate without affecting the power shafts by contact therewith, the turbine shaft being also geared to the power shafts.

37. In a gas turbine, the combination of power shafts having cranks at their inner extremities provided with antifrictional rotating bearings in their inner members, cylinders and pistons connected to said cranks and motive agent supplying and cut-off mechanism therefor operative by the power shafts and cranks thereof, and a turbine shaft with turbines thereon and having the opposite ends engaging said bearings and provided with turbines, the turbine and power shafts having compensating gearing interposed between them, the said bearings permitting the turbine shaft to run free at a greater speed than the power shafts and without affecting the speed of the latter shafts by contact and the pistons and supplying and cut-off mechanism operated by the said power shafts.

38. In a gas turbine, the combination of a turbine shaft having turbines thereon, cooling chambers in which said turbine shaft is mounted, a cooling partition separating said chambers and having a central opening through which extends the turbine shaft, the partition extending fully to the center of the structure and close to the turbine shaft to form distinct chambers, electrically controlled mechanism for feeding a motive agent to the turbines, and power shafts for actuating said mechanism having rotating bearings at the inner extremities thereof for the ends of the turbine shaft, the turbine shaft being geared to the power shafts.

39. In a gas turbine, distinct turbine devices, heated motive agent preparing means arranged in groups adjacent to the individual turbine devices, conduit means for separately feeding air and gas to the groups of generating means, and electrically operated controllers each embodying pairs of oscillating air and gas feed controlling devices for each of the said generating means.

40. In a gas turbine, distinct turbine devices, groups of cylinders and pistons alternately receiving the motive agent and delivering the latter agent to the turbine devices, valved feed means for the cylinders, and an electrically operated controller for each group of cylinders and pistons and the valved feed means comprising pairs of actuating devices which are in part shiftable individually and as a whole to govern the feed of the motive agent to the cylinders and pistons.

41. In a gas turbine, distinct turbine devices, groups of motive agent supply means alternately coöperating with said turbine devices and provided with valved gas and air feeding means, a controller for each group of motive agent supply means embodying pairs of valve opening devices and pairs of operating means for said valve opening devices, the pairs of operating means being separately or unitedly shiftable to modify the feed of the gas and air to the cylinders and pistons.

42. In a gas turbine, distinct turbine devices, groups of cylinders and pistons having valved feeding means coöperating therewith for regulating the successive charges of the motive agent thereto, and a controller for each group of cylinders and pistons having dual elements for controlling the feed of each cylinder and piston, portions of said dual elements being individually and unitedly shiftable to modify the feed of the motive agent to the cylinders and pistons.

43. In a gas turbine, distinct turbine devices, groups of cylinders and pistons having valved feeding means coöperating therewith for regulating the successive charges of the motive agent thereto, and a controller for each group of cylinders and pistons having dual elements for controlling the feed of each cylinder and piston, portions of said dual elements being individually and unitedly shiftable to modify the feed of the motive agent to the cylinders and pistons, the controllers being connected for synchronous operation to effect an alternation of activity of the groups of cylinders and pistons in the delivery of the motive agent to the adjacent turbine devices.

44. In a gas turbine, distinct turbine devices, groups of motive agent supply means coöperating with the turbine devices in alternation, and controllers coöperating with the supply means for regulating the feed of the motive agent thereto and provided with mechanical means for unitedly shutting off feed of the motive agent to the said groups of supply means and also having electrically controlled elements for individually shifting portions of the controllers to shut off the feed of the motive agent from a part of the groups of supply means.

45. In a gas turbine, distinct turbines, groups of motive agent supply means coöperating with each turbine, and controlling mechanism for the feed of the motive agent to the said supply means including individually and unitedly shiftable elements which are both mechanically and electrically operated.

46. In a gas turbine, distinct turbine devices provided with coöperating groups of motive agent preparing and delivering elements, and mechanism including controllers having pairs of devices coacting with the motive agent preparing and delivering elements and including unitedly and individually shiftable parts having an automatic operation to control the feed of the motive agent to the said elements.

47. In a gas turbine, a rotary turbine, a plurality of motive agent preparing and delivering elements, and mechanism for regulating the feed of the motive agent to said elements and embodying automatically shiftable devices which are mechanically operated to shift the elements as a whole and electrically operated to shift portions of the elements independently of the shifting of said elements as a whole.

48. In a gas turbine, distinct turbine devices, means for heating a motive agent and delivering the said agent alternately to the turbine devices, and means automatically controlling the feed of the motive agent and including groups of pairs of simultaneously reciprocating devices which are shiftable as a whole to cut off the supply of motive agent at intervals.

49. In a gas turbine, distinct turbine devices, means for heating a motive agent and for delivering the said agent alternately to the said turbine devices, and means for automatically controlling the feed of the motive agent and including groups of pairs of reciprocating devices mechanically shiftable as a whole and wherein the pairs have electrical means coöperating therewith for shifting the individual pairs.

50. In a gas turbine, distinct turbine devices, means for heating a motive agent and delivering the said agent alternately to the turbine devices, and means for automatically controlling the feed of the motive agent and including elements shiftable as a whole to shut off the motive agent and also individually shiftable to shut off the motive agent in part from the first named means.

51. In a gas turbine, distinct turbine devices, preparing means for heating a motive agent and for delivering the said heated agent to the turbine devices, and electrical means automatically controlling the feed of the motive agent and embodying a series of pairs of elements which are shiftable as a whole to shut off the motive agent from the said means and allow charges of air to be fed to the preparing means or individually shiftable to partially shut off the agent.

52. In a gas turbine, distinct turbine devices, automatically operating motive agent supply, compression and combustion means, and automatically operating electrical mechanism for controlling the inlet of the motive agent to the supply means and delivering to the distinct turbine devices in alternation and embodying groups of unitedly shiftable actuating elements which are provided with means for individually and automatically shifting them.

53. In a gas turbine, distinct turbine devices, motive agent supply means having valves, motive agent compression and combustion means having interval communication with the supply means, and mechanism for controlling the activity of the supply, compression and combustion means relatively to the distinct turbine devices and embodying a plurality of mechanically controlled unitedly shiftable elements to shut off the motive agent from the compression and combustion means and also electrically controlled to move a portion of said elements to shut off the motive agent from a part of the compression and combustion means.

54. In a gas turbine, distinct turbine devices, mechanism for controlling the supply of motive agent to the said turbine devices in alternation, and electrical controlling mechanism for regulating the supply of motive agent to the turbine devices embodying a plurality of elements mechanically shiftable as a whole to entirely shut off the motive agent from the turbine devices, the said elements also having electrical means coöperating therewith for independently shifting portions thereof to shut off the supply of motive agent relatively to parts of the turbine devices.

55. A gas turbine having turbine devices, means for supplying a motive agent to said turbine devices in alternation and including cylinders and pistons having combustion chambers exclusively in the outer ends thereof, the cylinders being provided with igniting devices which are exposed at intervals to the combustion chambers in the pistons, and electrically operated means for automatically shutting off the supply of motive agent to said cylinders and pistons and simultaneously rendering the igniting devices inoperative.

56. A gas turbine having distinct turbine devices, a series of reciprocating devices having combustion chambers coöperating with the distinct turbine devices and in which a motive agent is stored under pressure and automatically inclosed and ignited and burned, and electrically operated mechanism for controlling the supply of the motive agent to one or more of the combustion chambers of the reciprocating devices and the ignition of the motive agent held under pressure in the said chambers.

57. A gas turbine having distinct turbine devices, a series of reciprocating combustion chambers into which a motive agent is compressed, automatically inclosed, exploded and burned and delivered to the turbine devices in a heated state, and electrically operated mechanism for automatically controlling the supply of motive agent to the said combustion chambers and to either of the turbine devices.

58. A gas turbine having distinct turbine devices, a series of reciprocating combustion chambers into which a motive agent is compressed, automatically inclosed, exploded and burned during the movement of the said chambers, and electrically operated mechanism for automatically controlling the supply of the motive agent to one or more of said combustion chambers and to either of the distinct turbine devices.

59. A gas turbine having distinct turbine devices, independent series of reciprocating compression chambers having a mechanical operation to successively receive, automatically inclose, explode and burn a motive agent, means for igniting the charges of motive agent in the chambers, and electrically operated means for controlling the supply of the motive agent to one or more of the chambers.

60. In a gas turbine, distinct rotor devices, independent groups of motive agent preparing elements coöperating with the rotor devices and provided with valves, controllers for the groups of preparing elements having means both unitedly and individually shiftable for feeding and shutting off the motive agent to the groups of preparing elements in whole or in part, an automatically operating regulator connected to the controllers, power shafts actuated by the turbine devices, and governor means operatively connected to the power shafts and having actuating devices attached to portions of the regulator.

61. A gas turbine having distinct turbine devices, motive agent preparing and delivering means arranged in groups relatively to the said turbine devices, controllers coöperating with the groups of motive agent preparing means, governor means actuated by the turbine, a regulator organization connected to the controllers and the governor means, and timers operatively associated with the regulator organization, the regulator organization, timers and controllers embodying electrical means which are connected.

62. In a gas turbine, distinct turbine devices, groups of motive agent preparing elements coöperating with the turbine devices and having valves, controllers for the groups of elements, each controller embodying pairs of shiftable cylinders with reciprocating pistons therein and electromagnets and armatures coöperating with each pair of cylinders, eccentric means for operating the pistons, an electrically operated regulator organization connected to the controllers, and means between the pistons of the controllers and the said valves for admitting and shutting off supplies of the motive agent relatively to the preparing elements.

63. In a gas turbine, turbine devices, groups of motive agent preparing and delivering elements including electrical controlling means coöperating with said turbine devices, and timers operatively connected to said controlling means and each embodying continuous fixed conducting and insulating segments and movable contacts continuously traversing said segments in alternation when the turbine is in operation.

64. In a gas turbine, turbine devices, groups of motive agent preparing and delivering elements including igniting means coöperating with said turbine devices in alternation, and timers electrically connected to the groups of igniting means and also having a common shaft for effecting relative synchronous operation of the timers, the timers each embodying continuous conducting and insulating segments and movable contacts carried by the shaft and continuously traversing said segments in alternation when the turbine is active.

65. In a gas turbine, turbine devices, groups of motive agent preparing and delivering elements including igniting means coöperating with said turbine devices in alternation, timers electrically connected to the groups of igniting means and mechanically connected to each other for relative synchronous operation, a regulator organization electrically connected to and in part actuated by the timers, governor means connected to and operating a part of said regulator organization, and controllers operatively connected to the regulator organization.

66. In a gas turbine, turbine devices, groups of motive agent preparing and delivering elements including igniting means coöperating with said turbine devices, timers operatively connected to said igniting means and to each other, a regulator organization electrically and mechanically connected to the timers, governor means actuated by the turbine devices and also connected to parts of the regulator organization, and controllers for the charges of motive agent and air admitted to said elements, said controllers being connected to the regulator organization.

67. In a gas turbine, turbine devices, power shafts driven by said turbine devices, groups of motive agent preparing and delivering elements including igniting means coöperating with said turbine devices, timers operatively connected to the power shafts and said igniting means, a regulating organization electrically and mechanically connected to the timers, governor means attached to parts of the regulator organization for actuating the latter in accordance with the load on the turbine, and means also connected to the regulator organization and operating to control the admission of the motive agent to the said elements in alternation.

68. In a gas turbine, turbine devices, power shafts operated by said turbine devices, groups of motive agent preparing and delivering elements including igniting means for actuating said turbine devices, alternately electrically active timers operated by the power shafts, governor means connected to the regulator organization, and means for controlling the admission of charges of motive agent to the said elements and also connected to and actuated by portions of the timers and regulator organization to alternately render the groups of elements active and inactive as motive agent preparing and delivering means.

69. In a gas turbine, turbine devices, groups of motive agent preparing and delivering elements including igniting means coöperating with said turbine devices in alternation, oppositely disposed controllers for the motive agent, electrically connected timers, one for each group of elements and operative in alternation as electrical conducting means, an electromagnet connected to each timer, a rock shaft carrying a pair of armatures which are actuated by the electromagnets to operate the said shaft in opposite directions, a regulator organization embodying opposite groups of rotatable shoes and also having insulating rings provided with contacts to coöperate with said shoes, the groups of shoes being geared to the said rock shaft, governor means connected to the insulating rings of the regulating members to shift the said segments in accordance with the load on the turbine, and motive agent admitting controllers having shiftable elements connected to the rock shaft and also embodying electromagnets electrically connected to the contacts of the regulator members.

70. In a gas turbine, turbine devices, groups of motive agent preparing and delivering elements including igniting means coöperating with said turbine devices, controllers for the charges of motive agent entering said elements, timers electrically connected to the groups of igniting means and alternately operating to render each group active, a regulator organization embodying shiftable shoes and a corresponding number of shiftable contacts, the shoes being operated by the timers, and governor means connected to the said insulating rings of the regulator organization and movable by the latter in accordance with the load on the turbine, the controllers being also connected to the timers and regulator organization.

71. In a gas turbine, turbine devices, groups of motive agent preparing and delivering elements including igniting means coöperating with said turbine devices in alternation, timers operatively connected to said igniting means, a regulator organization having members each embodying a plurality of unitedly shiftable shoes and insulating rings carrying contact devices corresponding in number to the shoes, the movement of the shoes being effected through the operation of the timers, governor means connected to the insulating rings of the regulator organization for shifting said rings and the contacts carried thereby is accordance with the load on the turbine, and controllers for the charges of motive agent entering the said elements, said controllers embodying groups of devices which are unitedly shiftable and connected to the timers and regulator organization and electrical means for individually shifting the groups of elements and electrically connected to the contacts of the members of the regulator organization.

72. In a gas turbine, turbine devices having groups of motive agent preparing and delivering elements including igniting means coöperating with said turbine devices, governor means, a regulator organization having groups of shiftable insulated contacts and corresponding groups of shiftable shoes to engage said contacts, the shoes being of varying dimensions in sequence, timers for the groups of motive agent preparing and delivering elements and igniting means operatively associated with the shoes of the regulator organization, and motive agent supply controlling mechanism having unitedly and individually shiftable groups of elements connected to the timers and regulator organization.

73. A gas turbine having turbine devices, groups of motive agent preparing and delivering mechanism for said devices, and electrically operated means to regulate the supply, explosion, and combustion of a motive agent to and in said mechanism in proportion to the load on the turbine and embodying a regulator organization including shiftable insulated groups of contacts and groups of independently shiftable shoes to engage said contacts corresponding in number to the units of said groups.

74. A gas turbine having turbine devices, groups of motive agent preparing and delivering mechanism for said devices, and electrically controlled means to control the supply, explosion and combustion of a motive agent to and in said mechanism in proportion to the load on the motor and including a regulator organization embodying groups of insulated shiftable contacts and groups of independently shiftable shoes of varying dimensions to engage the contacts, and electrical connections for the contacts and shoes corresponding in number to the units of said groups.

75. A gas turbine having turbine devices, groups of motive agent preparing and delivering mechanism for said devices, and electrically operated mechanism for controlling the supply, explosion, and combustion of a motive agent to and in said mechanism in proportion to the load on the motor and embodying distinct timers alternately electrically active and regulator organizations in association therewith and comprising shiftable groups of insulated contacts and groups of independently shiftable shoes to engage said contacts corresponding in number to the units of said groups.

76. A gas turbine having mechanism for controlling the feed and preparing a motive agent for delivery as kinetic energy to portions of the turbine in proportion to the load on the turbine and including controllers, each embodying groups of pairs of cylinders and pistons connected for simultaneous shifting movement of all the pairs and also provided with electromagnets and armatures for individually shifting the pairs of cylinders and pistons, and feed valves for the motive agent and reciprocating devices between the valves and the pairs of pistons of the controllers.

77. A gas turbine having mechanism for preparing charges of motive agent and delivering the latter in the form of kinetic energy to different parts of the turbine in proportion to the load on the motor and embodying controllers comprising pairs of cylinders and pistons unitedly shiftable and also having electromagnets and armatures for individually shifting the pairs of cylinders and pistons, and timers and a regulating organization involving independently shiftable groups of contacts and shoes to engage the contacts, the contacts being connected to the electromagnets of the controllers and the shoes operative by the timers.

78. A gas turbine having a plurality of combustion means arranged in alternating groups, and means to automatically shut off the motive agent relatively to a part or the whole of each group as the load may require and embodying distinct pairs of devices which are shiftable at intervals in accordance with the change of operation of the groups and also relatively to the necessary reduction of the active parts in proportion to the load.

79. A gas turbine having turbine elements, a plurality of combustion means arranged in alternating operating groups, electrically operated means to automatically shut off the motive agent relatively to a part or the whole of each group as the load may require, and an electrical regulator organization having movable contact devices shiftable in accordance with the speed of the turbine to actuate the said electrical means to automatically shut off the motive agent.

80. A gas turbine having turbine elements, a plurality of combustion means arranged in alternating operating groups, electrical means for controlling the supply of motive agent to the said groups and for igniting said agent, and electric timers and a regulator organization in operative connected association and also connected to the said electrical means for regulating the supply of motive agent to the groups.

81. A gas turbine having turbine elements, a plurality of combustion means arranged in alternating operating groups, electrically operated controllers for the supply of motive agent relatively to the said groups and embodying shiftable supply controlling elements uniformly movable as a whole and also independently, an electrical regulator organization and timers in operative association and connected and controlling the operation of the controllers, and governor means operated by the turbine and connected to parts of the regulator organization for shifting the said parts in accordance with the load on the turbine.

82. In a gas turbine, intermediately disposed turbine devices, a base for supporting said devices, motive agent feeding and preparing organizations arranged in sections at opposite extremities of the turbine to coöperate with the turbine devices, and supplemental supports for said sections adjustably engaging the base for shiftably separating the said sections to and from the turbine devices to render the parts of the turbine accessible for repair and other purposes.

83. A gas turbine having turbine elements, a plurality of cylinders and pistons, means for fully charging the pistons to their maximum capacity with the motive agent which is automatically inclosed, exploded and burned within said pistons and delivering the full charges of the burned agent to the turbine elements, and electrical devices for operating the said means in proper timed relation.

84. A gas turbine having turbine elements, a plurality of combustion chambers which are reciprocatingly operative, means for fully charging, automatically inclosing and exploding and burning a motive agent in the said combustion chambers and effecting a complete relief of the latter of the burned agent and delivering the burned agent to the said turbine elements, and electrical devices for operating the said means.

85. In a gas turbine, turbine elements, groups of combustion chambers having a distinct operation in each group or portions of the chambers of each group successively operative, means for fully charging the active combustion chambers in each group with and automatically inclosing a motive agent therein and exploding and burning the said agent in the chambers, the said chambers being fully relieved of the burned agent by automatic deliverance of said burned agent to the turbine elements, and electrical devices for controlling and operating the said means.

86. In a gas turbine, turbine elements, groups of combustion chambers, mechanism for causing a portion of the chambers of each group to become inactive as combustion means in proportion to the load on the turbine and also for fully charging and effecting an automatic inclosure of a motive agent in the active chambers in each group and exploding and burning the said agent in the active chambers and finally effecting a complete relief of the active chambers of the burned agent, and electrical devices for operating and controlling the said mechanism.

87. In a gas turbine, turbine elements, a plurality of reciprocating combustion chambers having automatically operating inclosing means, means for fully charging the said chambers with motive agent embodying proper proportions of air and gas which always remain fixed or invariably constant, the motive agent by its pressure inclosing itself within the chambers, electrical devices for operating the said means, and electrical means for effecting explosion and burning of the motive agent charges in the chambers and mechanical means for delivering the burnt agent from the chambers to the turbine elements.

88. In a gas turbine or engine, power generating means comprising groups of movable motive agent burning means, and electrically actuated devices for automatically supplying a motive agent in charges to a portion of said motive agent burning means in proportion to the load on the turbine or engine.

89. In a gas turbine or engine, power generating means comprising groups of movable motive agent burning means, electrically operated devices for automatically supplying the motive agent in charges to a portion of said motive agent burning means, and a centrifugal governor for automatically regulating the electrically operated devices and the supply of charges in proportion to the load on the turbine or engine.

In testimony whereof I have hereunto set my hand in presence of two subscribing witnesses.

LEWIS A. HAINES.

Witnesses:
Wm. K. Williams,
Frieda Rebov.